(12) United States Patent
Mori et al.

(10) Patent No.: US 9,333,873 B2
(45) Date of Patent: May 10, 2016

(54) ELECTRIC MOTOR VEHICLE MANAGEMENT SYSTEM

(71) Applicant: Mitsubishi Electric Corporation, Tokyo (JP)

(72) Inventors: Kohei Mori, Tokyo (JP); Hiroshi Fujioka, Tokoyo (JP); Akinobu Sugiyama, Tokyo (JP); Takanori Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/771,256

(22) PCT Filed: Apr. 11, 2014

(86) PCT No.: PCT/JP2014/060497
§ 371 (c)(1),
(2) Date: Aug. 28, 2015

(87) PCT Pub. No.: WO2014/171407
PCT Pub. Date: Oct. 23, 2014

(65) Prior Publication Data
US 2016/0001671 A1   Jan. 7, 2016

(30) Foreign Application Priority Data

Apr. 19, 2013   (JP) ................................. 2013-088045

(51) Int. Cl.
*B60L 9/00* (2006.01)
*B60L 11/18* (2006.01)
(Continued)

(52) U.S. Cl.
CPC ......... *B60L 11/1861* (2013.01); *B60L 11/1816* (2013.01); *B60L 11/1827* (2013.01);
(Continued)

(58) Field of Classification Search
CPC ............ B60L 11/1861; B60L 11/1816; B60L 11/1846; B60L 2340/622; B60L 2230/16; B60L 2240/70; B60L 2250/16; B60L 11/1827; Y02T 10/7088; Y02T 10/7044; Y02T 10/7005; Y02T 10/705; Y02T 90/16; Y02T 90/162; Y02T 90/163; Y02T 90/169; Y02T 10/7291; Y02T 90/121; Y02T 90/14; Y02T 90/128; Y04S 10/126; Y04S 10/14; Y04S 30/12; Y02E 60/721; Y02E 60/722
USPC ........................................................... 701/22
See application file for complete search history.

(56) References Cited

U.S. PATENT DOCUMENTS 8,103,386 B2   1/2012   Ichikawa et al.
8,330,415 B2   12/2012  Sato et al.
(Continued)

FOREIGN PATENT DOCUMENTS

JP   2007-295717 A   11/2007
JP   2008-54439 A    3/2008
(Continued)

OTHER PUBLICATIONS

International Preliminary Report on Patentability dated Oct. 29, 2015 issued in counterpart application No. PCT/JP2014/060497.
(Continued)

*Primary Examiner* — Richard Camby
(74) *Attorney, Agent, or Firm* — Sughrue Mion, PLLC; Richard C. Turner

(57) ABSTRACT

In an electric motor vehicle management system according to the present invention, a portable terminal that is owned by a user and is located in an electric motor vehicle transmits vehicle condition information of the electric motor vehicle including position information of the portable terminal that has been detected by a position detector of the portable terminal to a vehicle condition receiver of an energy management system (EMS) installed in a customer. A battery charging-and-discharging plan creating unit of the EMS creates a charging and discharging plan for a battery through the use of the vehicle condition information of the electric motor vehicle. A charging and discharging device performs at least one of charging and discharging of the battery of the electric motor vehicle in accordance with the battery charging-and-discharging plan for the battery.

5 Claims, 21 Drawing Sheets

(51) Int. Cl.
*H02J 3/32* (2006.01)
*H02J 13/00* (2006.01)

(52) U.S. Cl.
CPC ......... *B60L11/1846* (2013.01); *B60L 2230/16* (2013.01); *B60L 2240/622* (2013.01); *B60L 2240/70* (2013.01); *B60L 2250/16* (2013.01); *H02J 3/32* (2013.01); *H02J 13/0006* (2013.01); *Y02E 60/721* (2013.01); *Y02E 60/722* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 10/14* (2013.01); *Y04S 30/12* (2013.01); *Y04S 30/14* (2013.01)

(56) References Cited

U.S. PATENT DOCUMENTS 8,918,376 B2 * 12/2014 Ambrosio ........... B60L 11/1824
707/694

9,236,760 B2 * 1/2016 Iyasu ................. B60L 11/1811
2013/0093393 A1 4/2013 Shimotani et al.
2014/0191722 A1 7/2014 Usuki et al.

FOREIGN PATENT DOCUMENTS

| JP | 4713623 B2 | 6/2011 |
|----|------------|--------|
| JP | 2012-100429 A | 5/2012 |
| JP | 2012-135170 A | 7/2012 |
| JP | 2012-151948 A | 8/2012 |
| JP | 2012-196028 A | 10/2012 |
| JP | 2013-65265 A | 4/2013 |
| WO | 2012/046269 A1 | 4/2012 |

OTHER PUBLICATIONS

Society of Automotive Engineer of Japan. "Jidosha kogaku—kiso—[Automotive Engineering—basics—]" Section 2.2 in Chap. 2. 1st ed, Dec. 31, 2002.

JPO Office Action for Application No. 2013-088045 dated Jan. 29, 2014.

JPO Office Action for Application No. 2013-088045 dated May 9, 2014.

International Search Report for PCT/JP2014/060497 dated Jun. 3, 2014 [PCT/ISA/210].

* cited by examiner

FIG. 5
(a)
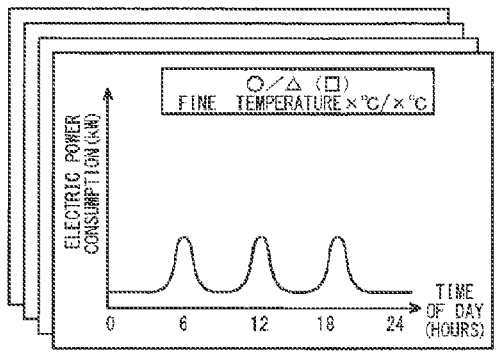
(b)
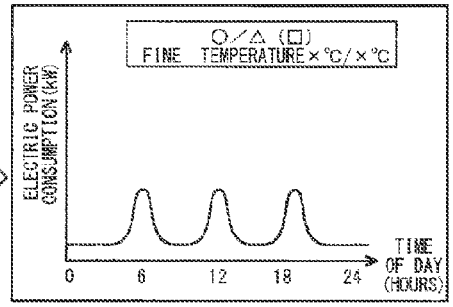
(c)
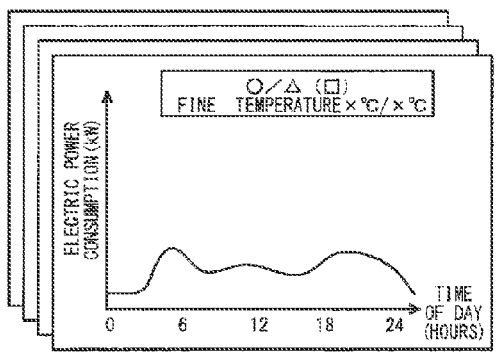
(d)
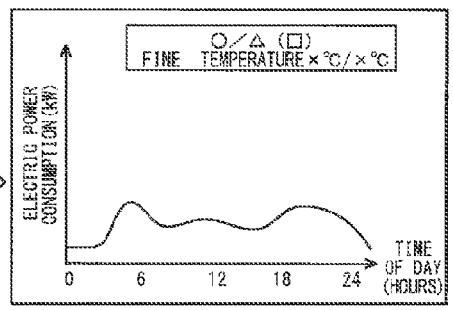
(e)
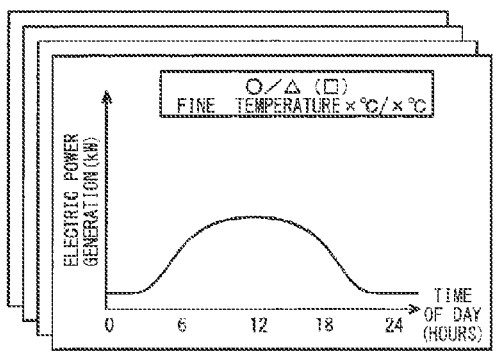
(f)
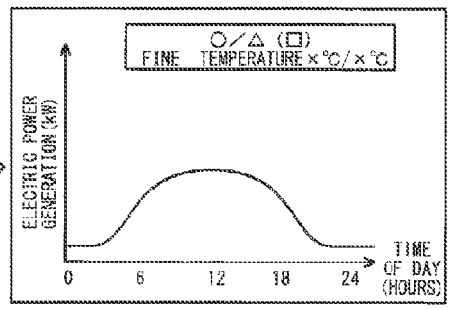

F I G . 6
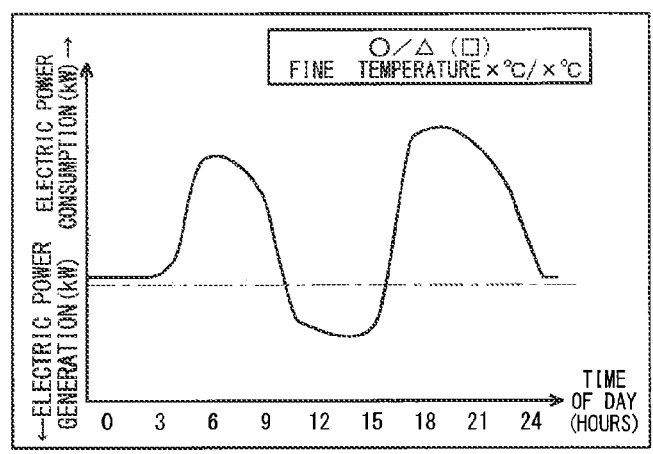

F I G . 1 3
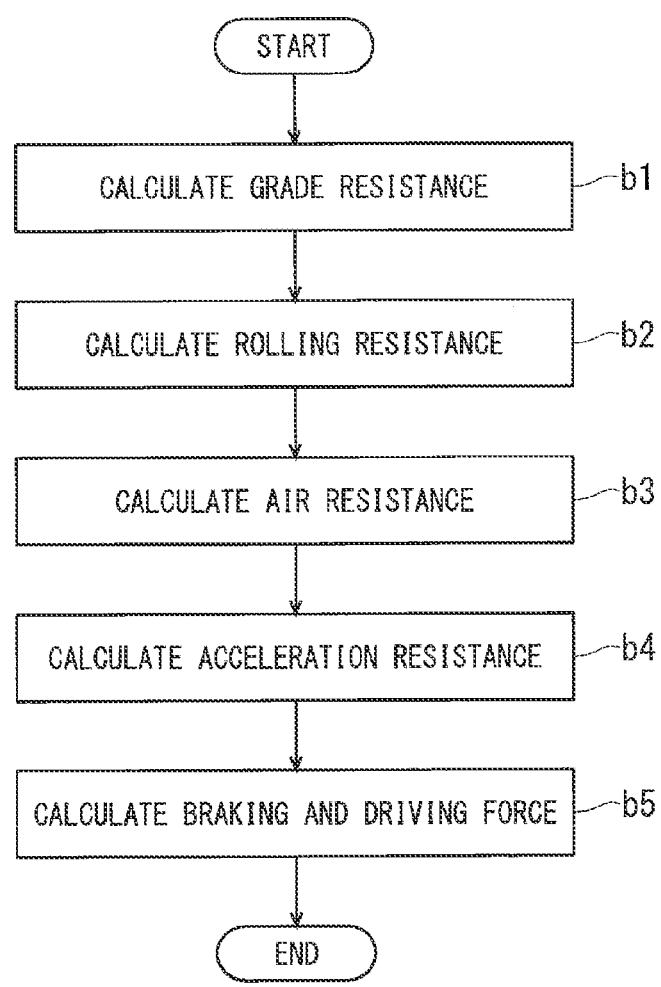

FIG. 15
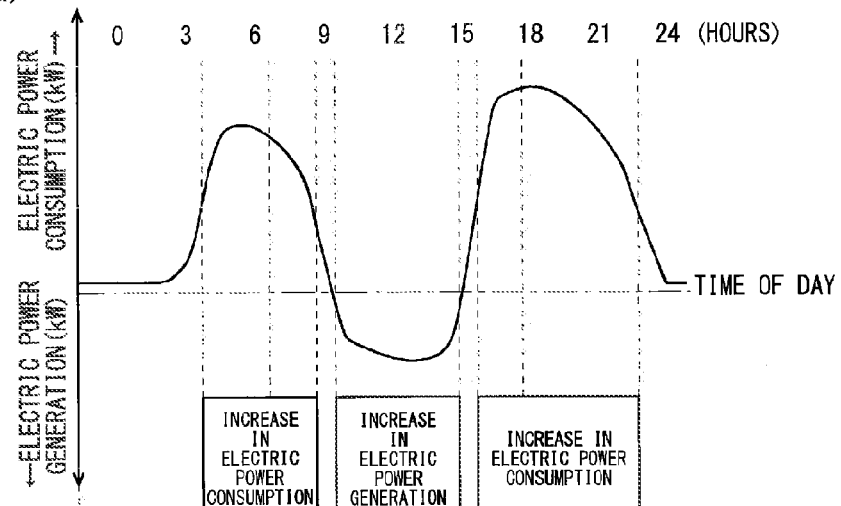
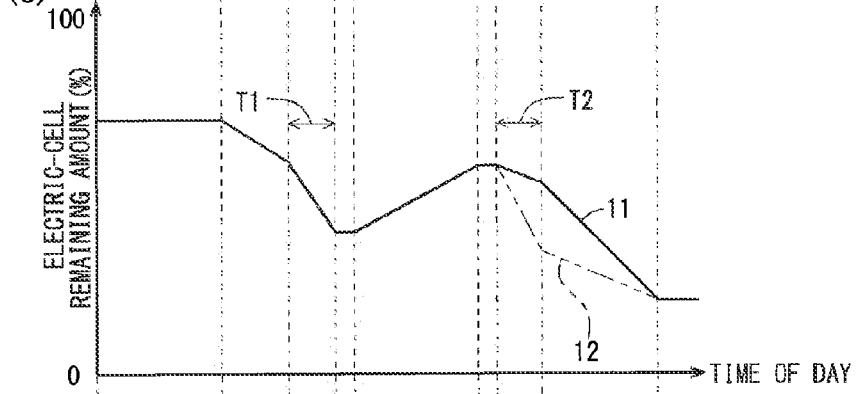
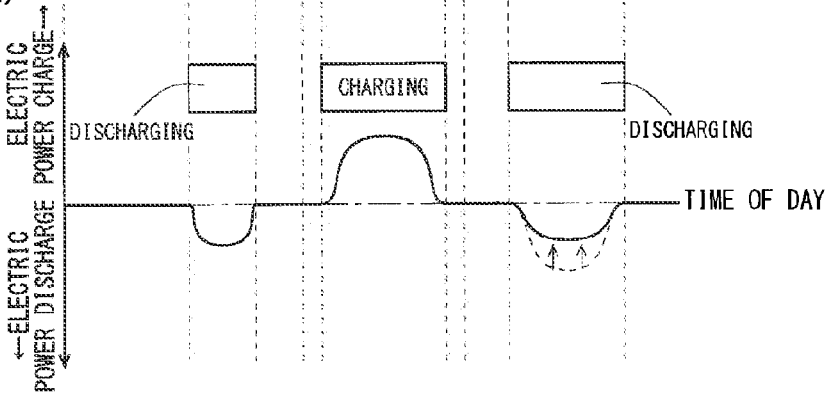

ELECTRIC MOTOR VEHICLE MANAGEMENT SYSTEM

CROSS REFERENCE TO RELATED APPLICATIONS

This application is a National Stage of International Application No. PCT/JP2014/060497, filed on Apr. 11, 2014, which claims priority from Japanese Patent Application No. 2013-088045, filed on Apr. 19, 2013, the contents of all of which are incorporated herein by reference in their entirety.

TECHNICAL FIELD

The present invention relates to an electric motor vehicle management system that controls the charging and discharging of a battery of an electric motor vehicle through an energy management system (EMS for short).

BACKGROUND ART

In recent years, attention is being given to the development of a next-generation electric power network referred to as "smart grid" that incorporates the means for automatically controlling supply of and demand for electric power into the power network. The smart grid controls the flow of electric power in the electric power network not only from the supply side but also from the demand side, to thereby optimize or balance supply of and demand for electric power.

One example is that batteries of electric motor vehicles owned by individual households can be used as the buffer for leveling demand for electric power by reducing its peak. For example, the peak of demand for electric power can be reduced if the electric power charged in the battery of the electric motor vehicle during periods of low demand for electric power, such as midnight, is used in the house during periods of peak demand for electric power. This also leads to a saving in electricity charges for individual households because the electricity charges for periods of low demand for electric power, such as midnight, are set to be lower than those for periods of high demand for electric power, such as daytime hours. The smart grid is intended for automatization of the above-described control of supply of and demand for electric power.

The electric power network managed by the smart grid is based on the assumption that batteries of electric motor vehicles are not only charged through the electric power supply from houses to the electric motor vehicles but also actively discharged through the electric power supply from the electric motor vehicles to the houses. Such flow of electric power is managed by an energy management system (EMS for short) provided for each customer.

For example, power generation installations such as photovoltaic power generation (PV for short) devices, predominantly large power load installations including electric water heaters and air conditioners, and electric storage installations such as batteries of vehicles are placed under the control of the EMS. The EMS controls the power generation installations, the power load installations, and the electric storage installations mentioned above such that the electric power demand is leveled. This works to balance supply of and demand for electric power, thereby cutting back the amount of electric power purchased from power companies.

Attempts are being made to improve the environmental performance of the whole society by expanding the target range of these techniques which has been within households. A start has been made at experiments and conceptual planning for equipping the commercial electric power network with the community energy management system (CEMS for short) with the objectives of leveling the electric power demand and balancing supply of and demand for electric power in each city and each town including customers in a neighborhood, such as neighboring houses and factories and buildings in the neighborhood.

Large-capacity batteries are used as the batteries to be mounted on electric motor vehicles in order to secure a range sufficient for users' daily traveling. The capacity of a battery to be mounted on an electric motor vehicle is so large that the electric power used by an ordinary household in several days can be provided by one electric motor vehicle. Thus, the availability of battery plays a big role in creating an electric power supply-and-demand managing plan for customers through the EMS.

However, the electric motor vehicle is used in the user's travel. Thus, while the user is traveling in the electric motor vehicle, the battery of the electric motor vehicle cannot be used for leveling the electric power demand in the house. The electric power stored in the battery is used for the traveling of the electric motor vehicle, so that the amount of electric power remaining in the battery (hereinafter also referred to as "battery remaining amount") at the time of departure differs from that at the time of return. The user needs to store, before departure, electric power required for the traveling in the battery of the electric motor vehicle.

Thus, the EMS adapted to electric motor vehicles is required to create and manage a charging and discharging plan for the barriers of electric motor vehicles in consideration not only of the leveling of electric power demand based solely on the predictions about electric power use by customers but also of, for example, use plans for electric motor vehicles and conditions of electric motor vehicles (see, for example, Patent Document 1).

In a case where the traveling schedule, particularly the traveling route, of the electric motor vehicle is known in advance, the amount of battery electric power consumed by the motor during the traveling of the electric motor vehicle can be calculated from the traveling route and the amount of electric power required for the traveling distance measured in advance. The EMS adapted to the electric motor vehicle calculates the amount of battery electric power consumed during the traveling of the electric motor vehicle on the basis of the traveling schedule of the electric motor vehicle and creates, in advance, the charging and discharging plan with consideration given to the battery remaining amount at the time of return of the electric motor vehicle.

However, there is no guarantee that the electric motor vehicle travels on the route specified in advance. The electric motor vehicle sometimes does not return with the battery remaining amount that has been estimated in advance for the time of return as a result of, for example, traveling on a wrong route, electric power consumption caused by traffic congestion, or charging and discharging of the battery at a stopover point.

To cope with these cases, an electric motor vehicle management probe is mounted on each electric motor vehicle. The electric motor vehicle management probe measures the conditions of the electric motor vehicle (hereinafter also referred to as "vehicle conditions") and transmits probe information being the measurement result to the EMS through communications. Thus, the idea of utilizing the probe information in the smart grid is under consideration (see, for example, Patent Document 2).

PRIOR ART DOCUMENTS

Patent Documents

Patent Document 1: Japanese Patent No. 4713623
Patent Document 2: Japanese Patent Application Laid-Open No. 2012-196028

SUMMARY OF INVENTION

Problems to be Solved by the Invention

In a case where the electric motor vehicle management probe is directly fixed to the electric motor vehicle as an item specifically for on-board use, the electric motor vehicle management probe needs to be designed in accordance with the life cycle and the environment resistance requirement of the electric motor vehicle instead of being designed in accordance with the life cycle and the environment resistance requirement of the communication terminal device (hereinafter also simply referred to as "communication terminal") such as a cellular phone. The "life cycle" means the supposed life span of a product in the design phase.

The communication terminals, which comply with new communication standards and provided with improved functions for the communication terminals themselves every year, are designed on the assumption that the products are replaced about every two to three years. Meanwhile, in Japan, similarly to the gasoline-engine driven vehicles for private use, the electric motor vehicles are designed on the assumption that the products are replaced approximately every ten years.

In a case where the electric motor vehicle management probe is directly fixed to the electric motor vehicle as an item specifically for on-board use, the electric motor vehicle management probe needs to be designed on the assumption that it has the life cycle of about ten years, which is similar to the life cycle of the electric motor vehicle. The electric motor vehicle management probe is therefore required to include components having longer life and higher durability than those of the components included in the communication terminals.

Consequently, the electric motor vehicle management probe itself becomes expensive, which translates into a burden in the initial investment made by the user and hinders the spread of the EMS adapted to the electric motor vehicle management probe.

In recent years, along with the growth in subscribers and subscriber lines, the communication carriers that provide the electric motor vehicle management probe with communication lines have been promoting the replacement with more efficient communication schemes in order to secure a larger amount of communication traffic in few finite frequency bands. It is expected that the technological innovation will continue to proceed on short cycles.

Meanwhile, the life cycle of the electric motor vehicle management probe is the same as that of the electric motor vehicles as described above and significantly differs from that of the communication terminals, thus possibly hindering the communication carriers from replacing the communication scheme. Failure to replace the communication scheme could drive the communication carriers into a situation where they have to use old scheme alongside a new scheme for many years.

As a result, the following problems arise. The communication carries are required to acquire an area for the installation of base station devices adapted to a new scheme. Another problem is an increase in the cost of maintaining the base station devices employing the old schemes. In addition, the simultaneous operation of the base station devices of both new and old communication schemes increases the electric power usage.

In many cases, a user who owns an electric motor vehicle, such as the driver who drives the electric motor vehicle, carries a communication terminal such as a cellular phone or a smartphone that has the communication function and can be connected to the internet besides the electric motor vehicle management probe, for example, during driving. If this is the case, in the electric motor vehicle, there exist at least two devices (hereinafter also referred to as "communication devices") equipped with the communication function, which are the electric motor vehicle management probe and the communication terminal in the possession of the user.

The electric motor vehicle management probe operates, or equivalently, communicates primarily during the user's operation of the electric motor vehicle. Conversely, the communication terminal does not communicate during the operation of the electric motor vehicle. That is, the user is charged by the communication carrier for the communication cost for each of the two communication devices that are not used simultaneously. This increases the financial burden on the user.

The possession of a plurality of electric motor vehicles by a user means the presence of the electric motor vehicle management probes as many as the electric motor vehicles, translating into the increased financial burden of communication charges to be paid to the communication carrier by the user.

The preset invention has an object to provide an electric motor vehicle management system capable of managing an electric power network including electric motor vehicles while keeping the initial introduction cost and the communication cost low for users of the electric motor vehicles.

Means to Solve the Problems

An electric motor vehicle management system according to the present invention includes: an electric motor vehicle including a motor for use in travel and a battery that supplies the motor with electric power; an energy management system including a battery charging-and-discharging plan creating unit that creates a charging and discharging plan for the battery; a portable terminal device, which is portable, including a position acquiring unit that acquires terminal position information indicating a position of the device and a terminal-side communication unit that communicates with the energy management system through a communication line; and a charging and discharging device that performs at least one of charging and discharging of the battery in accordance with the charging and discharging plan for the battery. The terminal-side communication unit transmits, while the portable terminal device is located inside the electric motor vehicle, vehicle condition information including the terminal position information acquired by the position acquiring unit and indicating conditions of the electric motor vehicle to the energy management system. The energy management system includes a vehicle condition receiver that receives the vehicle condition information transmitted from the terminal-side communication unit. The battery charging-and-discharging plan creating unit creates the charging and discharging plan for the battery through the use of the vehicle condition information received by the vehicle condition receiver.

Effects of the Invention

According to the electric motor vehicle management system of the present invention, while the mobile terminal device is located inside the electric motor vehicle, the vehicle condition information including the terminal position information acquired by the position acquiring unit is transmitted to the energy management system through the terminal-side communication unit. The terminal position information included in the vehicle condition information is acquired by the position acquiring unit while the portable terminal device is located inside the electric motor vehicle, and therefore, indicates the position of the electric motor vehicle. The vehicle condition information including the terminal position information is received by the vehicle condition receiver of the energy management system. The charging and discharging plan for the battery is created by the battery charging-and-discharging plan creating unit through the use of the received vehicle condition information. At least one of charging and discharging of the battery of the electric motor vehicle is performed in accordance with the created charging and discharging plan for the battery. The motor is supplied with electric power through the battery and the electric motor vehicle travels using the motor.

Thus, the vehicle condition information for use in creation of the charging and discharging plan for the battery is transmitted from the terminal-side communication unit of the portable terminal device to the energy management system. The terminal position information that is included in the vehicle condition information and indicates the position of the electric motor vehicle is acquired by the position acquiring unit of the portable terminal device. Consequently, each electric motor vehicle does not need to include a communication terminal device dedicated to the acquisition of information indicating the position of the vehicle and the transmission of the vehicle condition information including the acquired information. This allows for the management of the electric power network including electric motor vehicles while keeping the initial introduction cost and the communication cost low for users of the electric motor vehicles.

These and other objects, features, aspects and advantages of the present invention will become more apparent from the following detailed description of the present invention when taken in conjunction with the accompanying drawings.

BRIEF DESCRIPTION OF DRAWINGS

FIG. 5 A view showing an example of past data and an example of results of predictions on electric power consumption and electric power generation of each of household appliances 4.

FIG. 6 A view showing an example of results of predictions on electric power usage in the customer 1.

FIG. 13 A flowchart showing procedure for processing computation of braking and driving force of an electric motor vehicle in the electric-motor-vehicle energy consumption estimating unit 27.

FIG. 15 A view showing an example of results of predictions on electric power usage in the customer 1, an example of a use plan of the electric motor vehicle 5, an example of estimation results of changes in battery remaining amount, and an example of a battery charging-and-discharging plan after revision in a case where a user goes out in the electric motor vehicle 5.

DESCRIPTION OF EMBODIMENTS

First Embodiment

Figure 1:
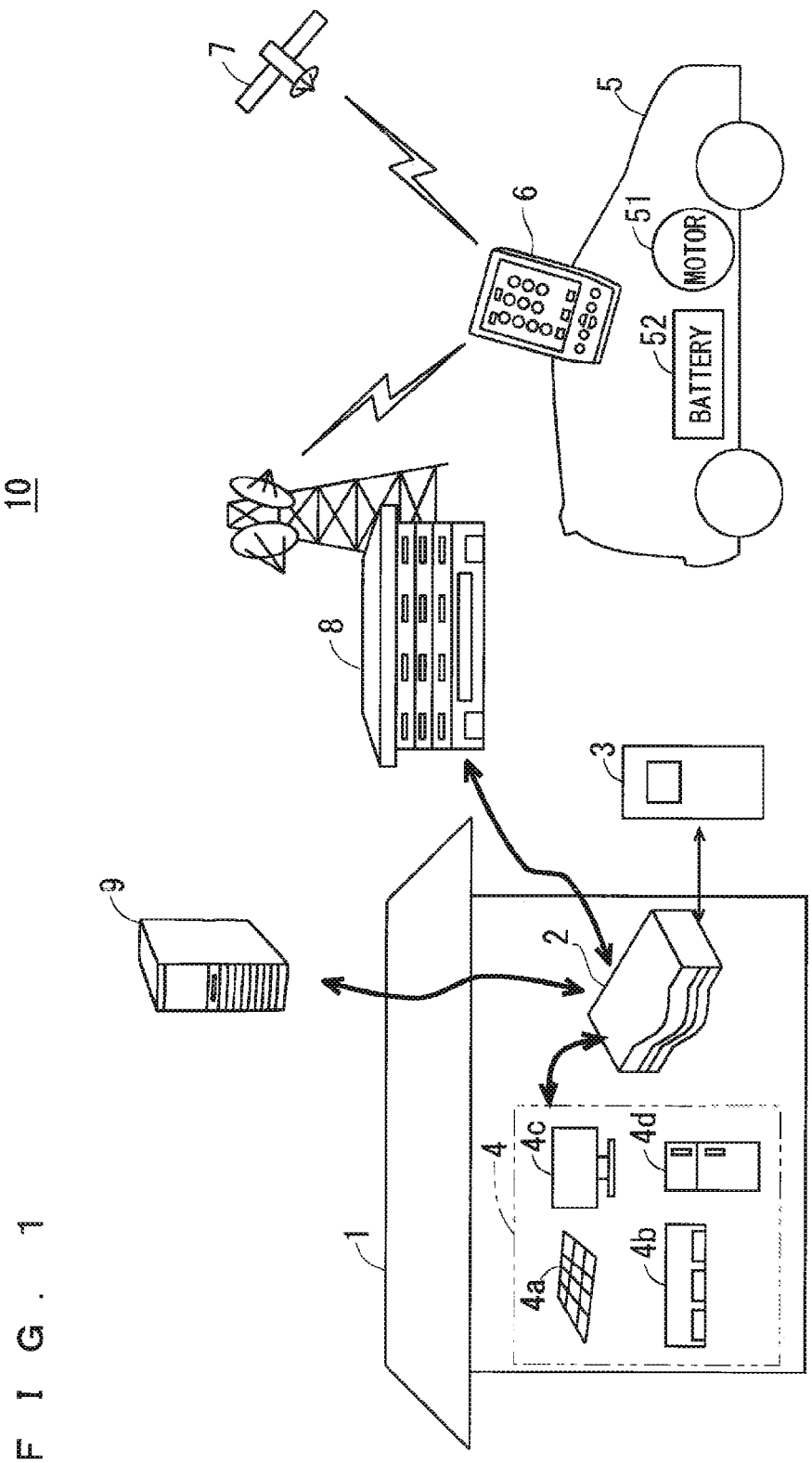
FIG. 1 A block diagram showing a schematic configuration of an electric motor vehicle management system 10 according to a first embodiment of the present invention.
Figure 3:
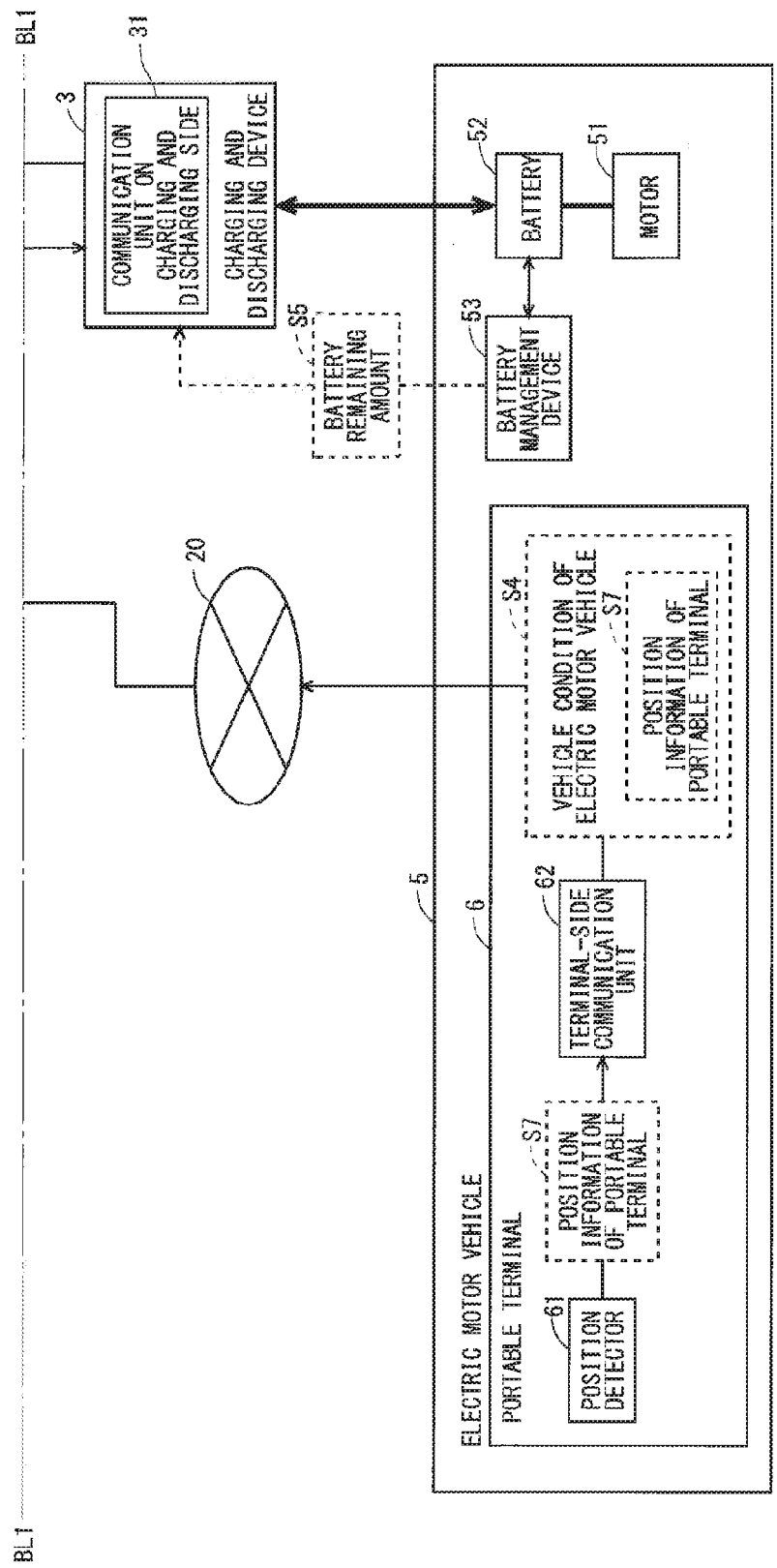
FIG. 3 A block diagram showing the configuration of the customer 1, the EMS 2, the electric motor vehicle 5, and the portable terminal 6 in the electric motor vehicle management system 10 according to the first embodiment of the present invention.

FIG. 1 is a block diagram showing a schematic configuration of an electric motor vehicle management system 10 according a first embodiment of the present invention. The electric motor vehicle management system 10 includes a customer 1, an energy management system (EMS) 2, a charging and discharging device 3, household appliances 4, an electric motor vehicle 5, a portable terminal device 6, a base station device 8, a server device 9, and a communication line 20 that is shown in FIG. 3 described below.

The EMS 2, the charging and discharging device 3, and the household appliances 4 are installed in the customer 1. The household appliances 4 include, for example, a photovoltaic power generation (PV) device 4a, an air conditioner 4b, audio visual equipment 4c, and a refrigerator 4d. The electric motor vehicle 5 includes a motor 51 and a battery 52. The base station device 8 is installed by a communication carrier.

The EMS 2 is connected with the household appliances 4 in the customer 1, the electric motor vehicle 5 to be connected to the charging and discharging device 3, the base station device 8, and the server device 9 such that the EMS 2 can communicate with each of them. The household appliances 4 and the battery 52 of the electric motor vehicle 5 are placed under the control of the EMS 2, which controls the household appliances 4 and the battery 52 of the electric motor vehicle 5 to level the demand for electric power. This works to balance supply of and demand for electric power.

The EMS 2 installed in the customer 1 is called differently depending on its control targets. For example, in a case where the control target is an ordinary household, the EMS 2 is referred to as home energy management system (HEMS for short). In a case where the control target is a roofed and walled structure, such as an office building or a department store, the EMS 2 is referred to as building energy management system (BEMS for short). In a case where the control target is a factory, the EMS 2 is referred to as factory energy management system (FEMS for short).

The charging and discharging device 3 is controlled by the EMS 2. The charging and discharging device 3 is connected to the electric motor vehicle 5 through a connector on the charging and discharging facility side, an electric power line, and a control signal line (not shown). The charging and discharging of the electric motor vehicle 5 is controlled through the exchange of commands and information between the charging and discharging device 3 and the electric motor vehicle 5. The commands and information are exchanged through the control signal line.

The transmission and receipt of electric power for charging and discharging of the electric motor vehicle 5 is performed through the electric power line between the charging and discharging device 3 and the battery 52. The charging and discharging device 3 is configured to be supplied with electric power by an electric power system (not shown) and to be capable of outputting electric power, or equivalently, discharging electricity to the electric power system. The electric power system includes commercial electric power networks.

The electric motor vehicle 5 is, for example, an electric vehicle (EV for short) or a plug-in hybrid electric vehicle (PHEV for short). In a case where the electric motor vehicle 5 is an EV, the electric motor vehicle 5 travels using the motor 51 as the driving source. In a case where the electric motor vehicle 5 is a PHEV, the electric motor vehicle 5 travels using both the motor 51 and an engine (not shown) as the driving source.

The portable terminal device (hereinafter also referred to as "portable terminal") 6 is owned by the user such as the driver of the electric motor vehicle 5. The portable terminal 6 receives radio wave signals transmitted from a global positioning system (GPS for short) satellite 7. The portable terminal 6 measures the current position of the portable terminal 6 using, for example, radio wave signals received from the GPS satellite 7.

While the portable terminal 6 is located inside the electric motor vehicle 5, for example, during the time that the user who owns the portable terminal 6 is riding in the electric motor vehicle 5, the current position (hereinafter also simply referred to as "position") of the portable terminal 6 is equivalent to the current position of the electric motor vehicle 5. Therefore, the current position of the electric motor vehicle 5 can be measured through the measurement of the current position of the portable terminal 6.

The portable terminal 6 generates, on the basis of the measured current position of the portable terminal 6, terminal position information that indicates the current position of the portable terminal 6. The terminal position information is equivalent to vehicle position information that indicates the position of the electric motor vehicle 5.

The portable terminal 6 is connected with the EMS 2 through the base station device 8 to be capable of communicating with the EMS 2. The portable terminal 6 transmits information to the EMS 2 and receives information from the EMS 2. For example, the portable terminal 6 transmits the terminal position information, which is equivalent to the vehicle position information indicating the current position of the electric motor vehicle 5, to the EMS 2 through the base station device 8.

The server device 9 estimates, for example, the energy consumption during the traveling of the electric motor vehicle 5 and computes an energy consumption estimated value that is the estimated value of energy consumed by the electric motor vehicle 5. The energy consumption estimated value computed by the server device 9 is transmitted to the EMS 2.

Figure 2:
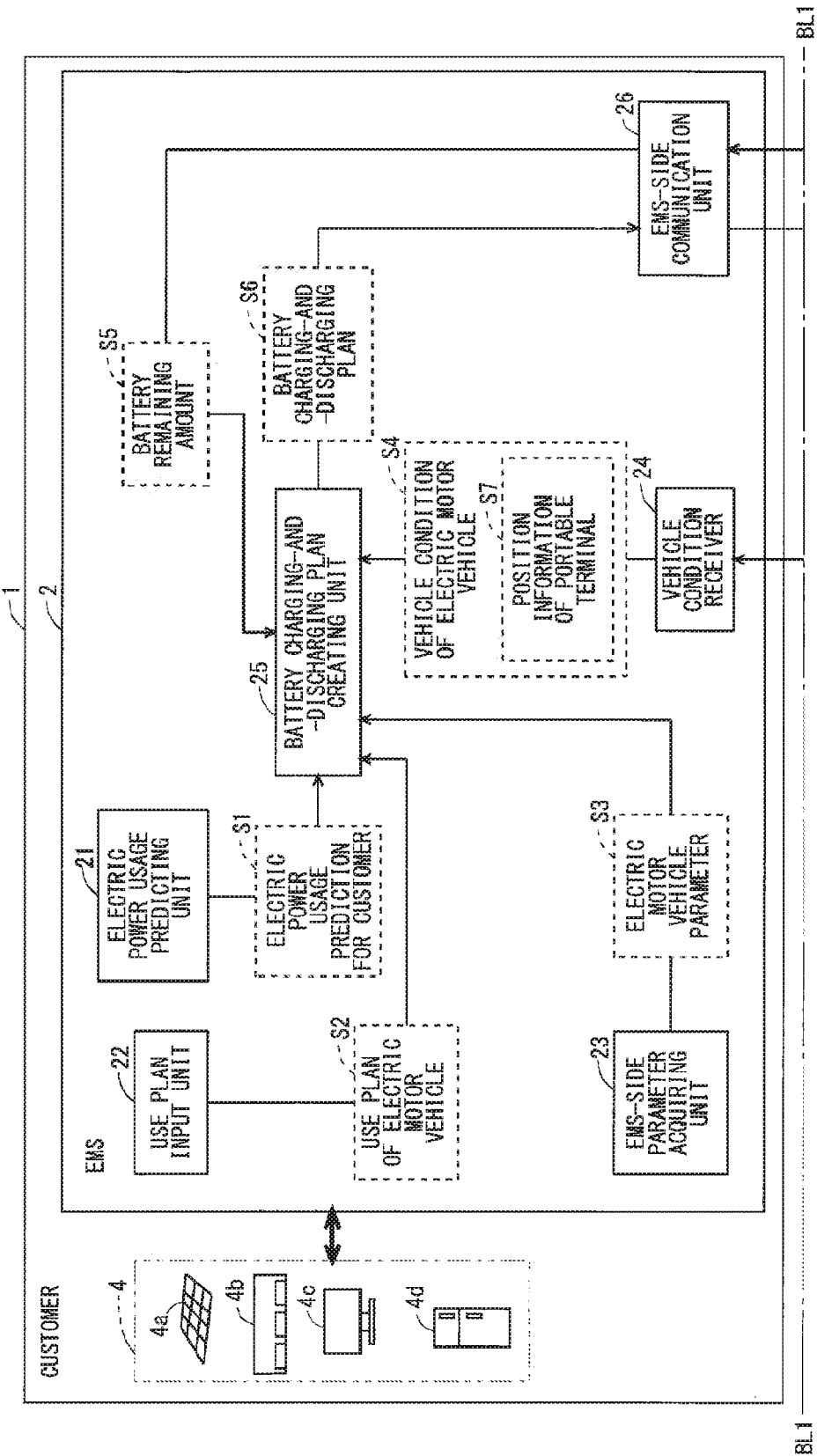
FIG. 2 A block diagram showing a configuration of a customer 1, an EMS 2, an electric motor vehicle 5, and a portable terminal 6 in the electric motor vehicle management system 10 according to the first embodiment of the present invention.

FIGS. 2 and 3 are block diagrams showing a configuration of the customer 1, the EMS 2, the electric motor vehicle 5, and the portable terminal 6 in the electric motor vehicle management system 10 according to the first embodiment of the present invention. FIGS. 2 and 3 are connected to each other at the position of a boundary line BL1. The electric motor vehicle management system 10 includes the customer 1, the EMS 2, the charging and discharging device 3, the household appliances 4, the electric motor vehicle 5, the portable terminal 6, the communication line 20, and the base station device 8 and the server device 9 that are shown in FIG. 1 described above. In FIGS. 2 and 3, the information handled in the electric motor vehicle management system 10 is indicated by broken-line boxes. For easy understanding, FIGS. 2 and 3 include only the excerpted functions that are essential for describing the customer 1, the EMS2, and the electric motor vehicle 5 of the present invention.

Firstly, the following describes the electric motor vehicle 5 and the portable terminal 6. The electric motor vehicle 5 includes the motor 51, the battery 52, and a battery management device 53. The battery 52 supplies the motor 51 with electric power while the electric motor vehicle 5 is traveling. The battery management device 53 is connected with the battery 52 and manages the condition of the battery 52. In particular, the battery management device 53 acquires battery information being the information on the battery 52 from the battery 52 and manages the condition of the battery 52 on the basis of the acquired battery information. The battery information includes, for example, battery remaining amount information S5 on the amount of electric power (hereinafter also referred to as "battery remaining amount") remaining in the battery 52.

In the present embodiment, the battery remaining amount information S5 indicates the value of the amount of electric power remaining in the battery 52. The battery management device 53 measures the amount of electric power remaining in the battery 52 and generates the battery remaining amount information S5 that indicates the value of the measured amount of electric power.

While the electric motor vehicle 5 is parked at the customer 1, the electric motor vehicle 5 is connected with the charging and discharging device 3 in order to store electric power required for the next traveling and to level the electric power demand from the customer 1. When the electric motor vehicle 5 is connected with the charging and discharging device 3, the battery 52 of the electric motor vehicle 5 is placed under the control of the EMS 2.

When the electric motor vehicle 5 is connected to the charging and discharging device 3, the battery management device 53 transmits the battery remaining amount information S5 of the battery 52 to the charging and discharging device 3. The charging and discharging device 3 transmits, to the EMS 2, the battery remaining amount information S5 of the battery 52 transmitted from the electric motor vehicle 5. The charging and discharging device 3 performs charging and discharging of the battery 52 of the electric motor vehicle 5 on the basis of the battery remaining amount information S5 of the battery 52 transmitted from the electric motor vehicle 5.

As an example of methods for connecting the charging and discharging device 3 and the electric motor vehicle 5, the charging and discharging device 3 and the battery 52 are directly connected to each other through a feeding port (not shown) of the electric motor vehicle 5, to thereby supply and demand electric power and transmit and receive, for example, control signals. In this case, the system of voltage and electric power in the battery 52 of the electric motor vehicle 5 is, for example, DC, while the system of voltage and electric power received by the customer 1 is, for example, AC. This creates a need for converters that convert the systems of voltage and electric power. These converters for voltage and electric power may be provided inside the charging and discharging device 3 or may be provided inside the electric motor vehicle 5.

The charging and discharging device 3 and the electric motor vehicle 5 may be connected by a method, such as the noncontact feeding technique, besides the above-described direct connection of the charging and discharging device 3 and the battery 52. The connection method according to the noncontact feeding technique can be employed as in the present embodiment.

Assume that the portable terminal 6 owned by the user, i.e., the driver of the electric motor vehicle 5 is located inside the electric motor vehicle 5 during the traveling of the electric motor vehicle 5. In this case, the portable terminal 6 only needs to be located inside the electric motor vehicle 5 but does not need to be connected with the electric motor vehicle 5 for transmission and receipt of signals. There is no prohibition against connecting the portable terminal 6 and the electric motor vehicle 5. Such connection, which is not required in the present embodiment, can be used for other purposes. The connection established between the portable terminal 6 and the electric motor vehicle 5 can be employed as in the present embodiment.

The portable terminal 6 includes a position detector 61 and a terminal-side communication unit 62. The position detector 61 acquires position information (hereinafter also referred to as "position information of the portable terminal 6") S7 indicating the position of the portable terminal 6 being the own device. The position information S7 of the portable terminal 6 is equivalent to the terminal position information and the position detector 61 is equivalent to a position acquiring unit.

According to the present embodiment, the position detector 61 includes a GPS sensor. The position detector 61 performs arithmetic operations using the radio wave signals transmitted from the GPS satellite 7 shown in FIG. 1, to thereby obtain the position including the latitude, the longitude, and the altitude of the measurement point and the acquisition time for the position. The position detector 61 generates, as the position information S7 of the portable terminal 6, the information that indicates the position including the latitude, the longitude, and the altitude of the measurement point that have been obtained from the arithmetic operations. In addition, the position detector 61 performs arithmetic operations based on the latitude, the longitude, and the altitude of the measurement point and the acquisition time that have been obtained, to thereby obtain the velocity and the azimuth of the portable terminal 6 being the own device.

Instead of using the radio wave signals transmitted from the GPS satellite 7, another method for measuring the position through the position detector 61 uses, as the position information S7 of the portable terminal 6, the position information of the base station device 8 that is in communication with the portable terminal 6. This method is effective in a case where the base station device 8 has a communication range that is sufficiently small.

As to the location beyond the reach of the radio wave signals transmitted from the GPS satellite 7, the position detector 61 measures the position of the portable terminal 6 using an acceleration sensor, a magnetometric sensor, and a tilt sensor that are separately provided in the portable terminal 6, to thereby obtain the position information S7 of the portable terminal 6.

The terminal-side communication unit 62 transmits vehicle condition information S4 that indicates the conditions (hereinafter also referred to as "vehicle conditions") of the electric motor vehicle 5 to the EMS 2 through the communication line 20. The vehicle condition information S4 of the electric motor vehicle 5 includes at least the position information S7 of the portable terminal 6 acquired through the position detector 61. The position information S7 of the portable terminal 6, which is acquired under the presence of the portable terminal 6 inside the electric motor vehicle 5, is equivalent to the vehicle position information described above and indicates the position of the electric motor vehicle 5.

The communication line 20 is, for example, the public wireless channel or the internet connection. The types of the communication line 20 are not limited to the above. Although not shown in FIGS. 2 and 3, the base station device 8 shown in FIG. 1 described above is connected with the communication line 20. The portable terminal 6 communicates with the EMS 2 through the base station device 8.

The vehicle condition information S4 of the electric motor vehicle 5 may include the information detected through the acceleration sensor, the magnetometric sensor, and the tilt sensor of the portable terminal 6 in addition to the position information S7 of the portable terminal 6. The vehicle condition information S4 of the electric motor vehicle 5 may include the information that indicates, for example, the acquisition time of the position of the measurement point and the velocity and the azimuth of the portable terminal 6 obtained by the position detector 61 described above.

The operation of the portable terminal 6 that transmits, to the EMS 2, the vehicle condition information S4 of the electric motor vehicle 5 including the position information S7 of the portable terminal 6 is executed by the hardware of the portable terminal 6 and the software that operates on the hardware of the portable terminal 6. The software is provided by, for example, the manufacturer of the EMS 2 or the manufacturer of the electric motor vehicle 5. The hardware of the portable terminal 6 in itself is sold to users through the communication carriers or the manufacturer of the portable terminal 6.

The portable terminal 6 includes the selection means for selecting the execution or the stopping of the software operation in order to prevent unnecessary operation of the software. This allows the user to operate the software only during traveling in the electric motor vehicle 5. Consequently, the electric motor vehicle management system 10 can be prevented from malfunctioning in a case where the user travels by, for example, the public transportation system, foot, or bicycle without using the electric motor vehicle 5.

The software may include the graphical user interface (GUI for short) to provide the user with the means for executing and stopping the operation of the terminal-side communication unit 62 without stopping the operation of the software.

In a case where the portable terminal 6 is located inside the electric motor vehicle 5, it does not need to be placed in a particular position. However, if the position detector 61 includes the GPS sensor, the portable terminal 6 is required to be located at a position where the communication between the GPS satellite 7 and the position detector 61 is not hampered. The portable terminal 6 also needs to communicate with the base station device 8 of the communication carrier, and therefore, the portable terminal 6 is required to be placed in a position where its communication with the base station device 8 is not hampered.

That is, the portable terminal 6 may be located in any position in the electric motor vehicle 5 as long as both the communication between the portable terminal 6 and the GPS satellite 7 and the communication between the portable terminal 6 and the base station device 8 are not hampered. The portable terminal 6 is not required to be fixed to the electric motor vehicle 5. The user of the electric motor vehicle 5 may wear the portable terminal 6 while driving the electric motor vehicle 5.

The following describes the EMS 2 and the charging and discharging device 3 provided in the customer 1. The EMS 2, which is provided in the customer 1, measures the state of electric power use by the household appliances 4 in the customer 1. The EMS 2 controls the electric power consumed by each of the household appliances 4 within controllable bounds on the basis of the state of electric power use by the household appliances 4 in the customer 1 in order to reduce, as much as possible, the amount of electric power (hereinafter also referred to as "purchase amount of electric power") purchased by the customer 1 from the commercial electric power network (not shown).

The household appliances 4 subjected to the control by the EMS 2 includes electric power load installations that consume a relatively large amount of electric power, such as the air conditioner 4b, the AV equipment, the refrigerator 4d, an electric water heater, and an induction heating (IH for short) cooking heater. The electric power consumed through operation of the electric power load installations having a relatively large amount of electric power consumption makes up a sizable proportion of the total electric power consumed in the customer 1. Thus, the electric power load installations have a great influence on the adjustment made by the EMS 2 to the purchase amount of electric power of the customer 1 and are therefore subjected to the control by the EMS 2.

The household appliances 4 subjected to the control by the EMS 2 includes the cogeneration system such as the PV device 4a. Unlike the ordinary household appliances, the cogeneration system provides the regulation control for electric power generation instead of the regulation control for electric power consumption. The regulation control for electric power generation is described below.

The configuration of the customer 1 is described as follows. In a case where the amount of electric power generated in the customer 1 (hereinafter also simply referred to as "electricity production") far exceeds the amount of electric power consumed in the customer 1, the customer 1 distributes electric power, i.e., sells electric power to the commercial electric power network such that the surplus electric power can be consumed by other customers in the neighborhood of the customer 1, such as neighboring houses, through the commercial electric power network that forms the electric power system.

However, if there is little demand for electric power in the power distribution network to which the customer 1 is connected, the system voltage increases and the frequency varies in the power distribution network. Thus, the cogeneration system through which electricity is sold to the electric power system requires regulation of electricity production.

For the photovoltaic power generation, the above-described configuration is provided inside the power conditioner that convers the electricity generated by the photovoltaic panels into the electric power suitable for the electric power system and the technique of interconnecting the systems for so-called reverse power flow allows each equipment to operate independently.

The customer 1 that has introduced the EMS 2 has the configuration described as follows. In a case where the electricity production by the cogeneration system increases, the electricity production is regulated, and besides, the amount of electric power consumed by the other household appliances 4 is temporarily increased, which reduces the reverse power flow from the customer 1 to the electric power system and thus adjusts the balance between supply of and demand for electric power in the customer 1.

In addition to the above-described function, the EMS 2 manages the charging and discharging of the battery 52 of the electric motor vehicle 5. In order to manage the charging and discharging of the battery 52 of the electric motor vehicle 5, the EMS 2 includes an electric power usage predicting unit 21, a use plan input unit 22, an EMS-side parameter acquiring unit 23, a vehicle condition receiver 24, a battery charging-and-discharging plan creating unit 25, and an EMS-side communication unit 26.

The electric power usage predicting unit 21 computes, on the day preceding the day of use, a predicted value of electric power usage per hour in the customer 1 on the day of use (hereinafter also referred to as "electric power usage predicted value") as the information indicating the electric power usage predicted value (hereinafter also referred to as "electric power usage prediction information") S1 for the customer 1.

Figure 4:
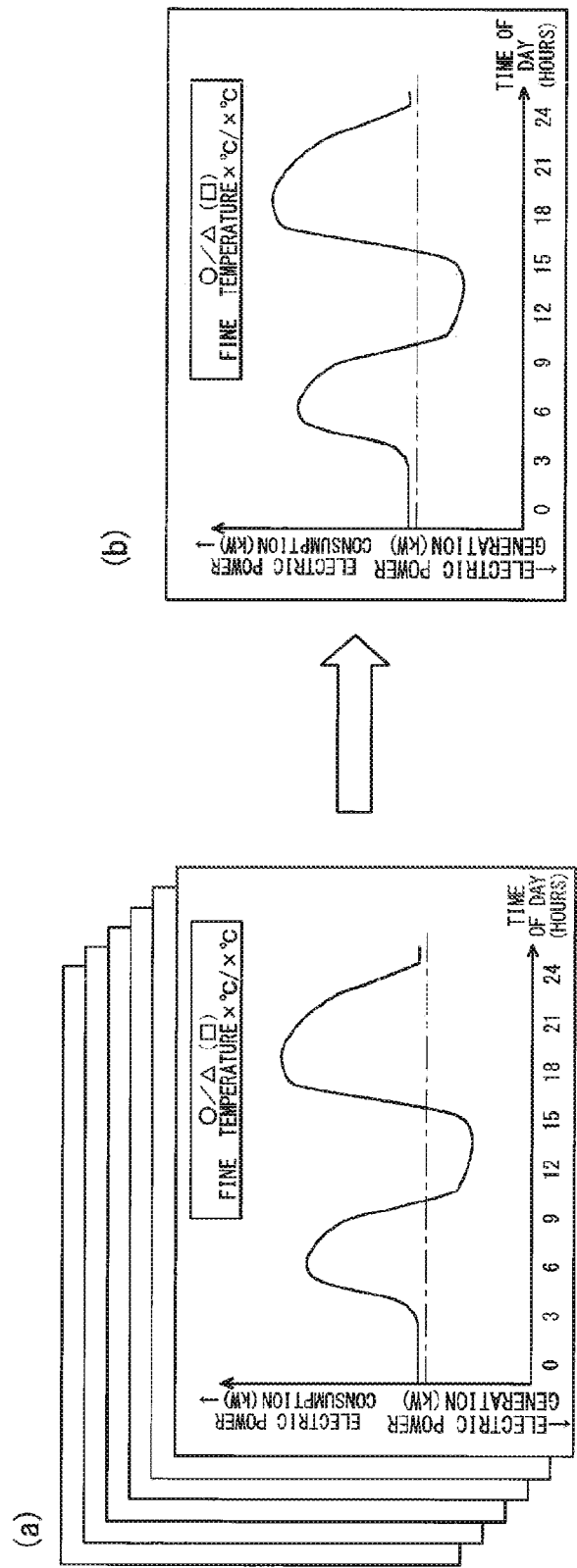
FIG. 4 A view showing an example of past data and an example of results of predictions on electric power usage in the customer 1.

FIG. 4 is a view showing an example of past data and an example of results of predictions on electric power usage in the customer 1. Part (a) of FIG. 4 shows the past data on electric power usage in the customer 1 and part (b) of FIG. 4 shows results of predictions on electric power usage in the customer 1. FIG. 4 shows the past data and the results of predictions on the total electric power usage in the customer 1 including all the electric power consumption and electric power generation of each of the household appliances 4.

In parts (a) and (b) of FIG. 4, the vertical axis above an alternate long and short dash line that is horizontal relative to the lateral axis indicates the electric power consumption (kW) and the vertical axis below the alternate long and short dash line indicates the electric power generation (kW). In parts (a) and (b) of FIG. 4, the lateral axis indicates the time of day (hours). The electric power usage predicting unit 21 obtains the electric power usage prediction information S1 for the customer 1 in, for example, the following manner.

For example, as shown in part (a) of FIG. 4, the EMS 2 stores the past several days' data on electric power usage in the customer 1. Each piece of data includes the information on the date, the day of week, the weather, and the temperature for each data acquisition date. In the description below, each date is indicated in the format of ○/Δ and each day of week is indicated inside the parenthesis as in "(□)." The temperature is indicated in the format of "temperature x° C./x° C." in the order of the minimum temperature and the maximum temperature. In the example shown in FIG. 4, the date and the day of week included in each data are indicated as "○/Δ(□), the weather is indicated as "fine," and the temperature is indicated as "temperature x° C./x° C."

With reference to the predicted weather and temperature of the day of use, holidays, and seasons, the electric power usage predicting unit 21 extracts the past data on electric power usage that is closest to the day in question from the stored data. As shown in part (b) of FIG. 4, the electric power usage predicting unit 21 uses the extracted data on electric power usage as the electric power usage prediction information S1 for the customer 1 on the day of use.

The electric power usage predicting unit 21 computes the electric power usage prediction information S1 for the customer 1 just once on the day preceding the day of use. On the day of use, the electric power usage predicting unit 21 does not keep using the electric power usage prediction information S1 for the customer 1 that was predicted on the day preceding the day of use, but makes a correction to the next electric power usage predicted value at predetermined periods on the day of use on the basis of a deviation made by the actual electric power usage from the electric power usage predicted value on the day preceding the day of use.

The method, which has been described above with reference to FIG. 4, for obtaining the electric power usage prediction information S1 for the customer 1 on the day of use utilizes, as the past electric power usage, the total electric power usage in the customer 1 including electric power consumption and electric power generation of each of the household appliances 4 instead of electric power consumption and electric power generation of the individual household appliances 4. However, the method for obtaining the electric power usage prediction information S1 for the customer 1 is not limited to the above.

For example, in order to improve the accuracy of the electric power usage prediction information S1 for the customer 1, the EMS 2 may store the past electric power consumption and electric power generation of each of the household appliances 4 as shown in FIG. 5 described below and obtain the electric power usage prediction information S1 for the customer 1 with reference to the predicted weather and temperature on the day of use, holidays, and seasons.

FIG. 5 is a view showing an example of past data and an example of results of predictions on electric power consumption and electric power generation of each of the household appliances 4. FIG. 6 is a view showing an example of results of predictions on electric power usage in the customer 1.

Parts (a), (c) and (e) of FIG. 5 show past data on electric power consumed or generated by each of the household appliances 4. In particular, part (a) of FIG. 5 shows past data on electric power consumed by air conditioner 4b, part (c) of FIG. 5 shows past data on electric power consumed by the refrigerator 4d, and part (e) of FIG. 5 shows past data on electric power generated by the PV device 4a.

Parts (b), (d) and (f) of FIG. 5 show results of predictions on electric power consumed or generated by each of the household appliances 4. In particular, part (b) of FIG. 5 shows results of predictions on electric power consumed by the air conditioner 4b, part (d) of FIG. 5 shows results of predictions on electric power consumed by refrigerator 4d, and part (f) of FIG. 5 shows results of predictions on electric power generated by the PV device 4a.

In parts (a) and (d) of FIG. 5, the vertical axis indicates the electric power consumption (kW). In parts (e) and (f) of FIG. 5, the vertical axis indicates the electric power generation (kW). In FIG. 6, the vertical axis above an alternate long and short dash line that is horizontal relative to the lateral axis indicates the electric power consumption (kW) and the vertical axis below the alternate long and short dash line indicates the electric power generation (kW). In parts (a) to (f) of FIG. 5 and FIG. 6, the lateral axis indicates the time of day (hours).

The EMS 2 may obtain the electric power usage prediction information S1 for the customer 1 in, for example, the following manner. As shown in parts (a), (c) and (e) of FIG. 5, the EMS 2 stores the several days' data on electric power consumption and electric power generation of each of the household appliances 4 in a storage unit (not shown). Each piece of data includes the information on the date, the day of week, the weather, and the temperature for each data acquisition date. In the example shown in FIG. 5, the date and the day of week included in each data are indicated as "○/Δ(□), the weather is indicated as "fine," and the temperature is indicated as "temperature x° C./x° C."

With reference to the predicted weather and temperature of the day of use, holidays, and seasons, the electric power usage predicting unit 21 extracts the past data that is closest to the day in question from the stored data on each of the household appliances 4 as shown in each of parts (b), (d) and (f) of FIG. 5. The electric power usage predicting unit 21 adds and subtracts the extracted electric power consumption and electric power generation of the household appliances 4 to compute a predicted value of electric power usage in the customer 1 as a whole and uses the predicted value as the electric power usage predication information S1 for the customer 1 shown in FIG. 6.

In order to further improve the accuracy of the predictions, the EMS may store the past data on electric power usage in a plurality of customers 1 in the server device 9, acquire data that agrees with extraction conditions from a relatively large number of data samples through the electric power usage predicting unit 21, and use the extracted data as the electric power usage prediction information S1 for the customer 1.

The use plan input unit 22 receives use plan information S2 of the electric motor vehicle 5. The use plan information S2 of the electric motor vehicle 5 includes for example, one or some pieces of information on the date and time of use of the electric motor vehicle 5, such as the date of use, the time of departure, the time of return, and the travel time, and the information on the traveling of the electric motor vehicle 5, such as the destination, the via point, the scheduled travel distance, and the amount of electric power consumption of the battery 52. The amount of electric power consumption is the electric power consumed per unit time, for example, per hour. The use plan information S2 of the electric motor vehicle 5 may include time period of use instead of the time of departure, the time of return, and the travel time.

Figure 7:
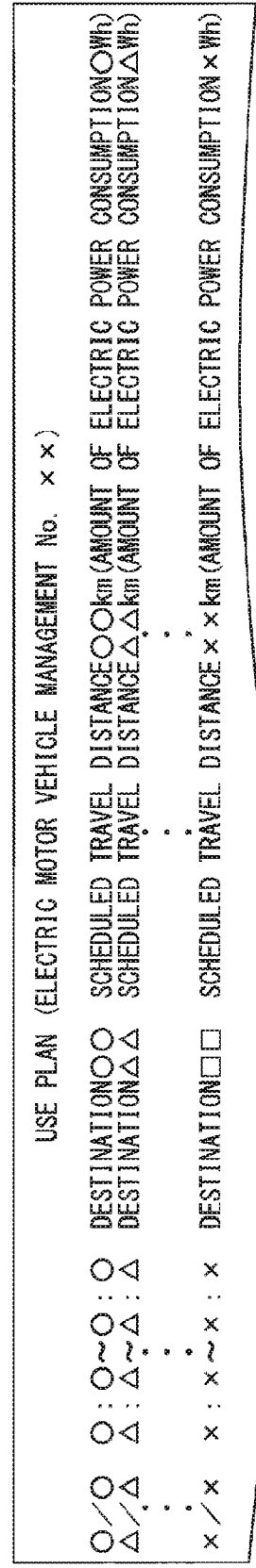
FIG. 7 A view showing an example of use plan information S2 of the electric motor vehicle 5.

FIG. 7 is a view showing an example of the use plan information S2 of the electric motor vehicle 5. In the example shown in FIG. 7, the use plan information S2 of the electric motor vehicle 5 includes the date of use, the time period of use, the destination, the scheduled travel distance, and the amount of electric power consumption of the battery 52. In FIG. 7, the date of use is indicated in the format of o/o, Δ/Δ, . . . , and x/x, and the time period of use is indicated in the format of o:o~o:o, Δ:Δ~Δ:Δ, . . . , x: x~x:x. For example, as shown in FIG. 7, the use pan information S2 of the electric motor vehicles 5 is managed for the each of electric motor vehicles 5 in accordance with electric motor vehicle management numbers (No.) provided for the individual electric motor vehicles 5.

The use plan information S2 of the electric motor vehicle 5 is, for example, registered through the use plan input unit 22 as described below. For example, the user makes access to the use plan input unit 22 of the EMS 2 from, for example, the portable terminal 6 in his or her possession, or a personal computer (PC for short) or a television receiver (hereinafter simply referred to as "television") installed in the customer 1 through the network and inputs the use schedule over a range of several days to several months. The user may input several use schedules at once. Similarly, the user makes access to the use plan input unit 22 of the EMS2, to thereby revise or delete the use schedule that has been previously input.

If the above-described network is unavailable, an input screen may be included in the EMS 2 itself, thereby providing the use plan input unit 22 capable of receiving the use plan information S2 of the electric motor vehicle 5.

The user may input all of the details of the use plan information S2 of the electric motor vehicle 5 through the use plan input unit 22. Alternatively, the use plan input unit 22 may supplement or correct a part of the details input by the user and output the use plan information S2 of the electric motor vehicle 5.

Under actual operation conditions, the details input by the user are limited to, for example, the time of departure and return of the electric motor vehicle 5 and the destination and via point. As for the travel time, the scheduled travel distance, and the amount of electric power consumption of the battery 52, the use plan input unit 22 makes access to, for example, map information in the EMS 2 or map information in the server device 9, to thereby supplement the insufficient information on the basis of results of a search for a travel route.

The use plan information S2 of the electric motor vehicle 5 is created for the individual electric motor vehicles 5 that belong to the EMS 2. Thus, in a case where a plurality of electric motor vehicles 5 are managed by the EMS 2, the use plan information S2 of the electric motor vehicle 5 is created for each of the electric motor vehicles 5. The created use plan information S2 of the electric motor vehicle 5 is managed for each of the electric motor vehicles 5 in accordance with the electric motor vehicle management numbers (No.) provided for the individual electric motor vehicle 5 as described above.

The EMS-side parameter acquiring unit 23 acquires electric motor vehicle parameter information S3 of the electric motor vehicle 5 required by the battery charging-and-discharging plan creating unit 25, which will be described below, to create a charging and discharging plan (hereinafter also referred to as "battery charging-and-discharging plan") for the battery 52. The electric motor vehicle parameter information S3 is required by the battery charging-and-discharging plan creating unit 25 in performing arithmetic operations to obtain battery charging-and-discharging plan information S6. The electric motor vehicle parameter information S3 includes, for example, the battery capacity of the electric motor vehicle 5, the restrictions on the input and output of electric power during charging and discharging, and the amount of electric power consumption based on the travel distance and the travel time.

The electric motor vehicle parameter information S3 is acquired through the EMS-side parameter acquiring unit 23 in, for example, the following manner. For example, at the time of purchase of the electric motor vehicle 5, the user may make access to the EMS-side parameter acquiring unit 23 of the EMS 2 from, for example, the portable terminal 6 in his or her possession, or the PC or the television installed in the customer 1 through the network and individually set the electric motor vehicle parameter information S3. The electric motor vehicle parameter information S3 is set by the user, and consequently, the electric motor vehicle parameter information S3 is acquired by the EMS-side parameter acquiring unit 23.

The EMS-side parameter acquiring unit 23 may be designed to download and acquire data that agrees with the electric motor vehicle 5 from the server device 9. The EMS-side parameter acquiring unit 23 may register, as the electric motor vehicle parameter information S3, the information that has been acquired by the EMS-side communication unit 26 from the battery management device 53 of the electric motor vehicle 5 at the time of connection of the electric motor vehicle 5 to the charging and discharging device 3 for charging and discharging of electric power. On the basis of the operation conditions of the charging and discharging device 3, the EMS 2 may reregister, i.e., update the data through feedback on the electric motor vehicle parameter information S3 that has already been registered.

The vehicle condition receiver 24 is connected with the communication line 20 provided by the communication carrier. The vehicle condition receiver 24 receives the vehicle condition information S4 of the electric motor vehicle 5 transmitted from the portable terminal 6 in the electric motor vehicle 5 via the communication line 20. In the present embodiment, the vehicle condition information S4 of the electric motor vehicle 5 includes at least the position information S7 of the portable terminal 6.

A particular method is not necessarily used to establish connection between the vehicle condition receiver 24 and the communication line 20 provided by the communication carrier. For example, the communication line, such as the internet connection, may be shared with other information appliances in the customer 1.

Figure 8:
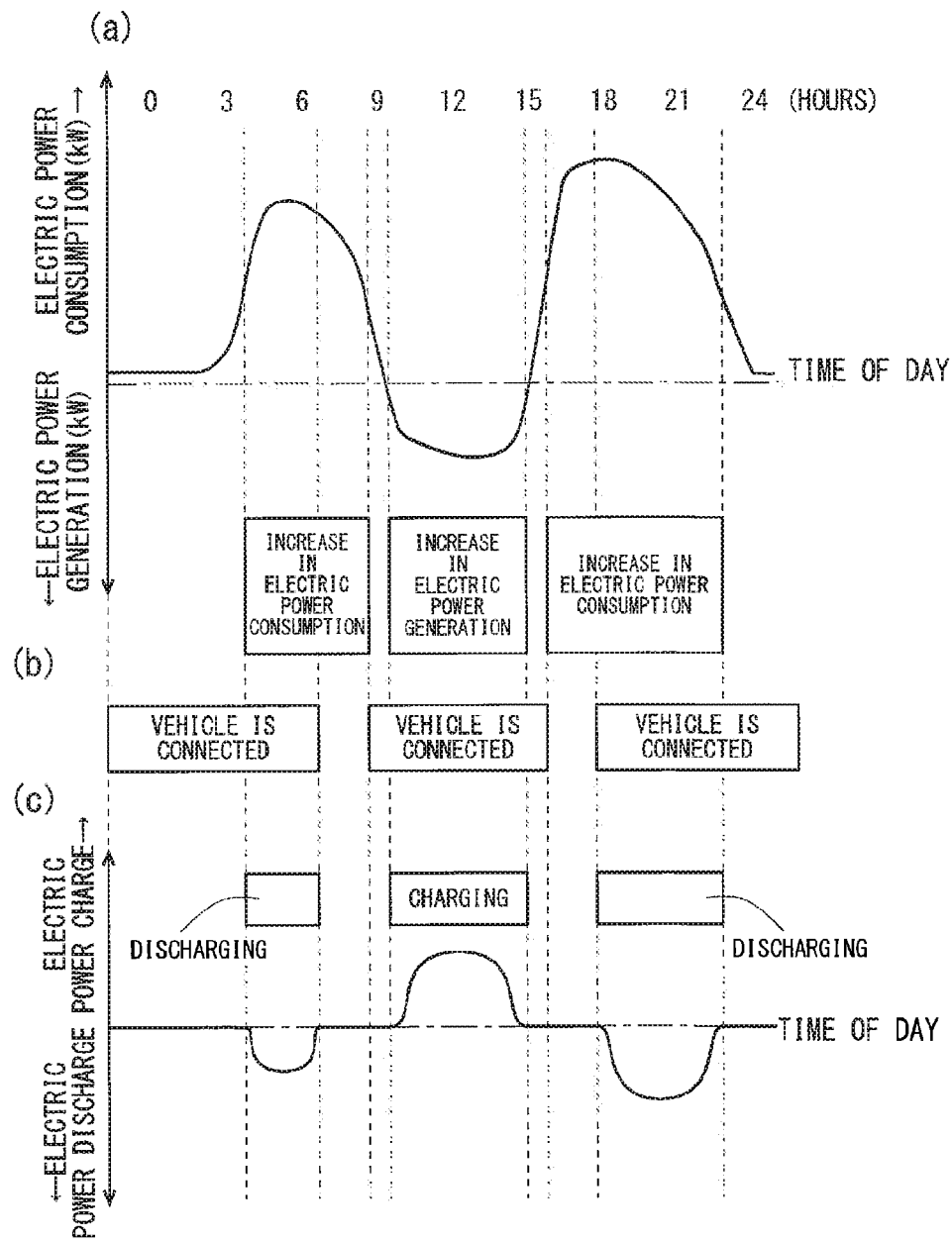
FIG. 8 A view showing, side-by-side, an example of results of predictions on electric power usage in the customer 1, an example of a use plan of the electric motor vehicle 5, and an example of a battery charging-and-discharging plan.

The following describes the operation of the battery charging-and-discharging plan creating unit 25 in a case where the electric motor vehicle 5 is connected with the charging and discharging device 3. FIG. 8 is a view showing, side-by-side, an example of results of predictions on electric power usage in the customer 1, an example of the use plan of the electric motor vehicle 5, and an example of the battery charging-and-discharging plan. Part (a) of FIG. 8 shows an example of results of predictions on electric power usage in the customer 1 represented by the electric power usage prediction information S1 for the customer 1. Part (b) of FIG. 8 shows an example of the use plan of the electric motor vehicle 5 represented by the use plan information S2 of the electric motor vehicle 5. Part (c) of FIG. 8 shows an example of the battery charging-and-discharging plan represented by the battery charging-and-discharging plan information S6. Part (c) of FIG. 8 indicates the time period over which electricity should be discharged from the electric motor vehicle 5 to the customer 1 along with the time period over which the electric motor vehicle 5 should be charged.

In parts (a) to (c) of FIG. 8, the lateral axis indicates the time of day (hours). In part (a) of FIG. 8, the vertical axis above an alternate long and short dash line that is horizontal relative to the lateral axis indicates the electric power consumption (kW) and the vertical axis below the alternate long and short dash line indicates the electric power generation (kW). In part (c) of FIG. 8, the vertical axis above an alternate long and short dash line that is horizontal relative to the lateral axis indicates electric power charge and the vertical axis below the alternate long and short dash line indicates electric power discharge.

The battery charging-and-discharging plan creating unit 25 produces the battery charging-and-discharging plan information S6 for attaining two objectives of "leveling electric power demand from the customer 1" and "securing electric power required for traveling of the electric motor vehicle 5."

As show in part (a) of FIG. 8, in creating a plan with the objective of "leveling electric power demand from the customer 1," the battery charging-and-discharging plan creating unit 25 extracts, from the electric power usage prediction information S1 for the customer 1, the time period over which the electric power consumption increases and the time period over which the electric power generation increases in the customer 1. In the example shown in part (a) of FIG. 8, the electric power consumption of the customer 1 increases during the time period from 3 hours to 8 hours and the time period from 16 hours to 24 hours. The electric power generation of the customer 1 increases during the time period from 9 hours to 15 hours.

On the basis of the extracted time periods and the time periods over which the electric motor vehicle 5 is connected with the charging and discharging device 3 according to the use plan information S2 of the electric motor vehicle 5 shown in part (b) of FIG. 8, the battery charging-and-discharging plan creating unit 25 extracts, as shown in part (c) of FIG. 8, the time period over which electricity should be discharged from the electric motor vehicle 5 to the customer 1 and the time period over which the electric motor vehicle 5 should be charged.

In the example shown in part (b) of FIG. 8, the electric motor vehicle 5 is connected with the charging and discharging device 3 during the time period from 0 hours to 6 hours, the time period from 8 hours to 16 hours, and the time period from 18 hours to 24 hours. In the example shown in part (c) of FIG. 8, the electricity should be discharged from the electric motor vehicle 5 to the customer 1 during the time period from 3 hours to 6 hours and the time period from 18 hours to 24 hours. The electric motor vehicle 5 should be charged from 9 hours to 15 hours.

As shown in part (c) of FIG. 8, the battery charging-and-discharging plan creating unit 25 ultimately obtains the battery charging-and-discharging plan information S6 that specifies electric power charge and electric power discharge on the basis of the time period over which electricity should be discharged from the electric motor vehicle 5 to the customer 1 and the time period over which the electric motor vehicle 5 should be charged.

At this time, the electric power charge and the electric power discharge according to the obtained battery charging-and-discharging plan information S6 stand at the values obtained by subjecting the "electric power consumption and electric power generation which the customer 1 wants to reduce" computed from the electric power usage prediction information S1 for the customer 1 to the limitations including the capability of the battery 52 in the electric motor vehicle parameter information S3, the battery remaining amount information S5, and the conversion capability of the electric power converter provided in the charging and discharging device 3. The capability of the battery 52 is specified according to the total capacity, the available capacity range, and the current limitation of the battery 52.

In creating a plan with the objective of "securing electric power required for traveling of the electric motor vehicle 5," the battery charging-and-discharging plan creating unit 25 corrects, on the basis of the time of departure of the electric motor vehicle 5 and the amount of electric power consumed through traveling according to the use plan information S2 of the electric motor vehicle 5, the battery charging-and-discharging plan information S6 that has been planned and created with the objective of "leveling the electric power demand from the customer 1" such that the amount of electric power required for the traveling will be secured in the battery 52 before the time of departure of the electric motor vehicle 5.

For the correction of the battery charging-and-discharging plan information S6, in a case where the amount of electric power required for the traveling cannot be secured in the battery 52 before the time of departure of the electric motor vehicle 5 according to a revision made only to the amount of charging and discharging that has been planned in the first place for "leveling the electric power demand from the customer 1," the battery charging-and-discharging plan creating unit 25 produces a new schedule for charging and adds the schedule to the battery charging-and-discharging plan information S6.

As for the planning with the objective of "leveling the electric power demand from the customer 1" and the planning with the objective of "securing electric power required for traveling of the electric motor vehicle 5," the planning with the objective of "securing electric power required for traveling of the electric motor vehicle 5" is given a higher priority in order to avoid inconvenience for the user of the electric motor vehicle 5. Note that the EMS 2, which is not necessarily designed to place a higher priority on "securing electric power required for traveling of the electric motor vehicle 5" all the time, is configured such that the user can decide the order of precedence. As described in the present embodiment, the planning with the objective of "securing electric power required for traveling of the electric motor vehicle 5" is designed to be corrected in accordance with the planning with the objective of "leveling the electric power demand from the customer 1," but alternatively, such planning may be designed to provide coordination between the objectives.

Figure 9:
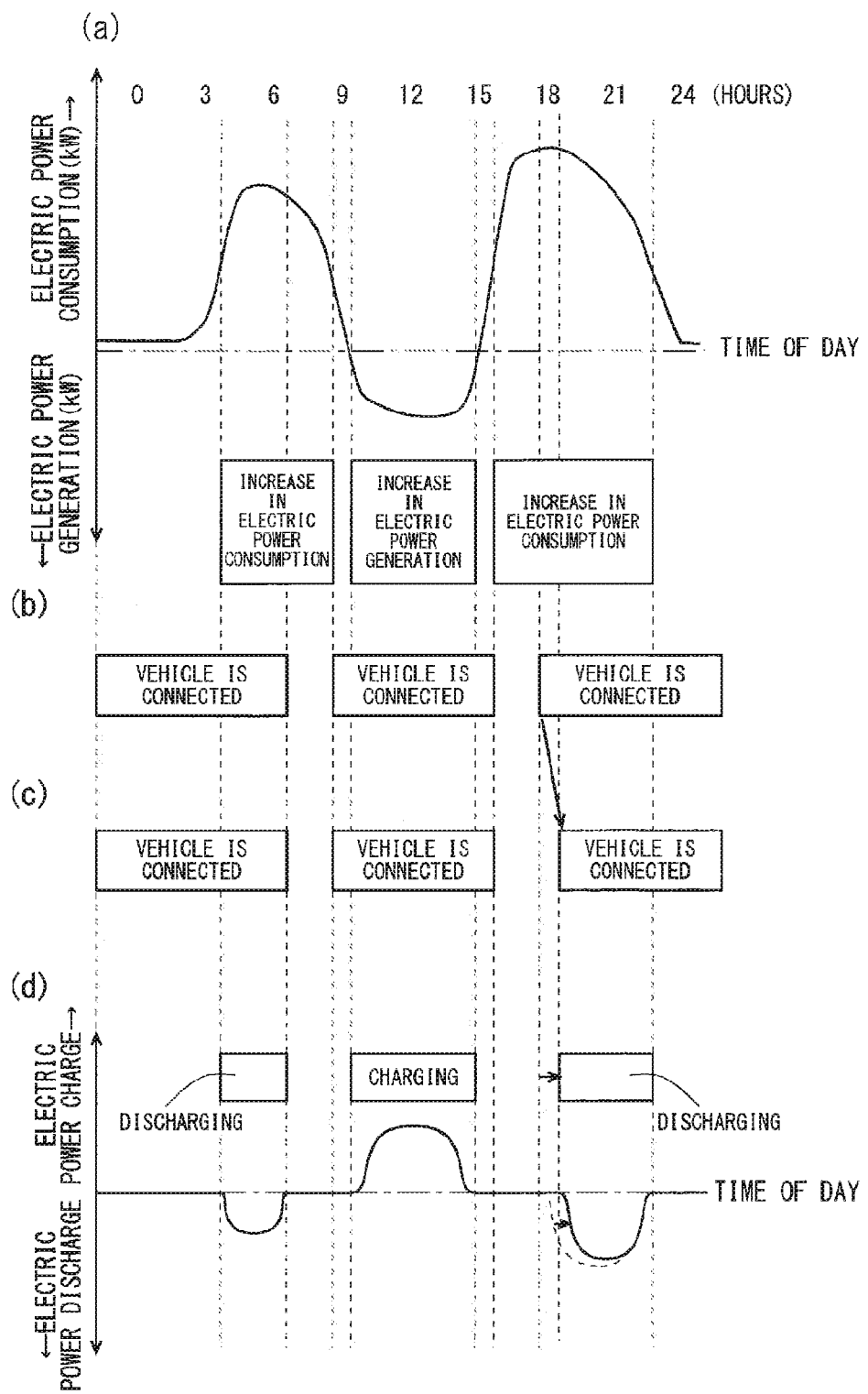
FIG. 9 A view showing, side-by-side, an example of results of predictions on electric power usage in the customer 1, an example of a use plan of the electric motor vehicle 5, and an example of a battery charging-and-discharging plan in a case where a user goes out in the electric motor vehicle 5.

The following describes the operation of the battery charging-and-discharging plan creating unit 25 while the user goes out in the electric motor vehicle 5. FIG. 9 is a view showing, side-by-side, an example of results of predictions on electric power usage in the customer 1, an example of the use plan of the electric motor vehicle 5, and an example of the battery charging-and-discharging plan while the user goes out in the electric motor vehicle 5.

Part (a) of FIG. 9 shows an example of results of predictions on electric power usage in the customer 1 represented by the electric power usage prediction information S1 for the customer 1. Part (b) of FIG. 9 shows an example of the use plan of the electric motor vehicle 5 represented by the initial use plan information S2 of the electric motor vehicle 5. Part (c) of FIG. 9 shows an example of the use plan of the electric motor vehicle 5 represented by the latest use plan information S2 of the electric motor vehicle 5. Part (d) of FIG. 9 shows an example of the battery charging-and-discharging plan represented by the latest battery charging-and-discharging plan information S6. Part (d) of FIG. 9 indicates the time period over which electricity should be discharged from the electric motor vehicle 5 to the customer 1 along with the time period over which the electric motor vehicle 5 should be charged. Part (a) of FIG. 9 corresponds to part (a) of FIG. 8 and part (b) of FIG. 9 corresponds to part (b) of FIG. 8.

In parts (a) to (d) of FIG. 9, the lateral axis indicates the time of day (hours). In part (a) of FIG. 9, the vertical axis above an alternate long and short dash line that is horizontal relative to the lateral axis indicates the electric power consumption (kW) and the vertical axis below the alternate long and short dash line indicates the electric power generation (kW). In part (d) of FIG. 9, the vertical axis above an alternate long and short dash line that is horizontal relative to the lateral axis indicates electric power charge and the vertical axis below the alternate long and short dash line indicates electric power discharge.

Assume that the battery charging-and-discharging plan creating unit 25 has already produced the battery charging-and-discharging plan information S6 for attaining two objectives of "leveling electric power demand from the customer 1" and "securing electric power required for traveling of the electric motor vehicle 5" before the departure of the electric motor vehicle 5.

While the user goes out in the electric motor vehicle 5, the user operates the software installed on the portable terminal 6. Thus, the vehicle condition receiver 24 receives, from the portable terminal 6 of the user, the vehicle condition information S4 of the electric motor vehicle 5 including the position information S7 of the portable terminal 6. The battery charging-and-discharging plan creating unit 25 detects, on the basis of the position information S7 of the portable terminal 6 received by the vehicle condition receiver 24, a revision made to the use plan information S2 of the electric motor vehicle 5 that has been initially scheduled. For example, the latest use plan of the electric motor vehicle 5 shown in part (c) of FIG. 9 indicates that the return of the electric motor vehicle 5 will be delayed as compared with the initial use plan of the electric motor vehicle 5 shown in part (b) of FIG. 9.

The delay period of the return of the electric motor vehicle 5 can be estimated from a deviation between the position information S7 of the portable terminal 6 and the position information of the customer 1 and from the reduction rate of the deviation. That is, the time of return of the electric motor vehicle 5 can be estimated from the deviation between the position information S7 of the portable terminal 6 and the position information of the customer 1 and from the reduction rate of the deviation.

The battery charging-and-discharging plan creating unit 25 creates, again, the charging and discharging plan of the battery (hereinafter also referred to as "battery charging-and-discharging plan") represented by the battery charging-and-discharging plan information S6 through the use of the use plan information S2 of the electric motor vehicle 5 that has been revised. At this time, the battery charging-and-discharging plan creating unit 25 delays the scheduled discharging start time for, for example, one hour in line with the expected delay in return. Thus, as shown in part (d) of FIG. 9, the initial battery charging-and-discharging plan shown by a broken-line curved line is corrected as indicated by a solid curved line.

Consequently, electricity should be discharged from the electric motor vehicle 5 to the customer 1 during the time period from 3 hours to 6 hours and the time period from 19 hours to 24 hours as a result of shortening of the time period between 18 hours and 24 hours shown in part (c) of FIG. 8 described above by one hour. As in the case of part (c) of FIG. 8, the electric motor vehicle 5 should be charged during the time period from 9 hours to 15 hours.

The battery charging-and-discharging plan represented by the battery charging-and-discharging plan information S6 is created again through the use of the use plan information S2 of the electric vehicle that has been revised as described above, so that the battery charging-and-discharging plan can be corrected in line with the state of use of the electric motor vehicle 5. Consequently, the electric power demand can be leveled and the supply of and demand for electric power can be balanced in a more appropriate manner.

The description has been given on the case where the return of the electric motor vehicle 5 is delayed as compared with the initial use plan of the electric motor vehicle 5 according to the present embodiment, which is not limited thereto. For example, in a case where the return of the electric motor vehicle 5 is moved forward as compared with the initial use plan of the electric motor vehicle 5, the battery charging-and-discharging plan information S6 is created again as in the present embodiment, producing the same effect. The method for creating the battery charging-and-discharging plan information S6 in this case is the same as that in a case where the electric motor vehicle 5 is connected with the charging and discharging device 3, and a description thereof is omitted.

According to the present embodiment, as described above, the time of return is estimated simply on the basis of the deviation between the position information S7 of the portable terminal 6 and the position information of the customer 1 and the reduction rate of the deviation, in other words, on the basis of the positional relation between the electric motor vehicle 5 and the customer 1 in a straight line. Alternatively, the time of return may be estimated by, for example, reflecting the travel route information through the use of the remaining travel distance and the reduction rate of the remaining travel distance instead of the positional relation between the electric motor vehicle 5 and the customer 1 in a straight line. If this is the case, the more accurate time of return can be obtained with consideration given to, for example, traffic congestion based on the information provide by, for example, the vehicle information and communication system (VICS (registered trade mark) for short).

The vehicle condition receiver 24 receives, in some cases, the vehicle condition information S4 of the electric motor vehicle 5 transmitted from the portable terminal 6 of the user even though the electric motor vehicle 5 is connected with the charging and discharging device 3. In such a case, there is a high possibility that the user has gone out by means of transportation other than the electric motor vehicle 5, which is left at the customer 1, and the software installed on the portable terminal 6 keeps operating in error. In this case, the battery charging-and-discharging plan creating unit 25 operates as in the case where the electric motor vehicle 5 is connected with the charging and discharging device 3 described above.

In some cases, while the user goes out in the electric motor vehicle 5, the vehicle condition information S4 of the electric motor vehicle 5 transmitted from the portable terminal 6 of the user is not received by the vehicle condition receiver 24, or the position information is not updated even though the vehicle condition information S4 of the electric motor vehicle 5 transmitted from the portable terminal 6 of the user is received. In these cases, there is a high possibility that the user, who has gone out in the electric motor vehicle 5, has forgotten about staring the operation of the software installed on the portable terminal 6 or the user has left the portable terminal 6 at the customer 1. In these cases, the battery charging-and-discharging plan creating unit 25 retains the plan that has been created before the departure of the electric motor vehicle 5. In either case, the battery charging-and-discharging plan creating unit 25 of the EMS 2 returns to the operation that is based on the previous battery charging-and-discharging plan information S6.

The EMS-side communication unit 26 communicates with the charging and discharging device 3 installed in the customer 1. When the electric motor vehicle 5 is connected to the charging and discharging device 3, the EMS-side communication unit 26 acquires the battery remaining amount information S5 from the battery management device 53 of the electric motor vehicle 5. On the basis of the battery charging-and-discharging plan information S6 planned by the battery charging-and-discharging plan creating unit 25, the EMS-side communication unit 26 transmits, to the charging and discharging device 3, the command about charging and discharging, to thereby supply electric power to or demand electric power from the battery 52 of the electric motor vehicle 5. During charging and discharging of the battery 52, the EMS-side communication unit 26 continuously receives the battery remaining amount information S5 from the battery management device 52 in order to monitor the battery conditions.

As described above, the vehicle condition information S4 of the electric motor vehicle 5 that is used for creation of the battery charging-and-discharging plan is transmitted from the terminal-side communication unit 62 of the portable terminal 6 to the EMS 2. The position information S7 of the portable terminal 6, which indicates the position of the electric motor vehicle 5 and is included in the vehicle condition information S4 of the electric motor vehicle 5, is acquired by the position detector 61 of the portable terminal 6. This eliminates the need for providing each of the electric motor vehicles 5 with a dedicated communication terminal device for acquiring the position information S7 of the portable terminal 6 that indicates the position of the electric motor vehicle 5 and for transmitting the vehicle condition information S4 of the electric motor vehicle 5 including the position information S7. This allows for the management of the electric power network including the electric motor vehicles 5 while keeping the initial introduction cost and the communication cost low for users of the electric motor vehicles 5.

In particular, the electric motor vehicle management system 10 according to the present embodiment uses the portable terminal 6 including the position detector 61 in place of the electric motor vehicle management probe being the item specifically for on-board use, to thereby transmit, to the EMS 2, the position information S7 of the portable terminal 6 that is equivalent to the position information of the electric motor vehicle 5. This allows the battery charging-and-discharging plan creating unit 25 of the EMS 2 to create and correct, as before, the battery charging-and-discharging plan represented by the battery charging-and-discharging plan information S6 of the electric motor vehicle 5. Moreover, the initial introduction cost for the users of the electric motor vehicles 5 can be kept low, which accelerates the spread of the EMS 2 associated with the running of the electric motor vehicles 5.

In the present embodiment, the description has been given assuming that the electric motor vehicle 5 and the charging and discharging device 3 are capable of discharging electric power from the battery 52 in order to level the electric power demand from the customer 1. However, the electric motor vehicle 5 and the charging and discharging device 3 are not necessarily ready for discharging. For example, they are ready only for charging in order to store electric power required for the next traveling.

If this is the case, the present embodiment allows for creation and correction of the battery charging-and-discharging plan represented by the battery charging-and-discharging plan information S6 through the use of the vehicle condition information S4 of the electric motor vehicle 5. In this case, as to the two objectives of "leveling the electric power demand from the customer 1" and "securing electric power required for traveling of the electric motor vehicle 5," the battery charging-and-discharging plan creating unit 25 described in the present embodiment performs control with emphasis on the latter objective of "securing electric power required for traveling of the electric motor vehicle 5."

Second Embodiment

Figure 10:
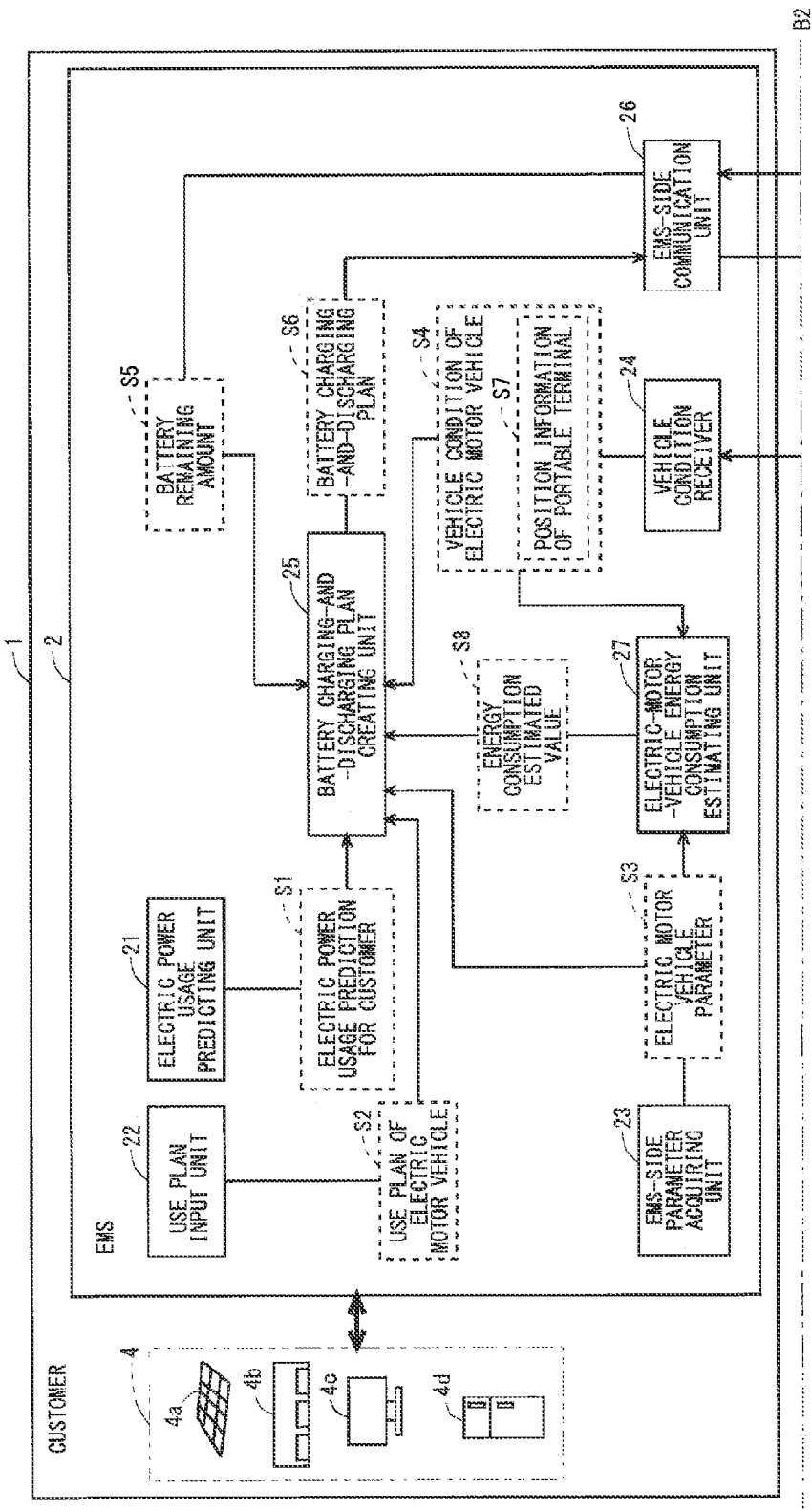
FIG. 10 A block diagram showing a configuration of the customer 1, the EMS 2, the electric motor vehicle 5, and the portable terminal 6 in an electric motor vehicle management system 10A according to a second embodiment of the present invention.
Figure 11:
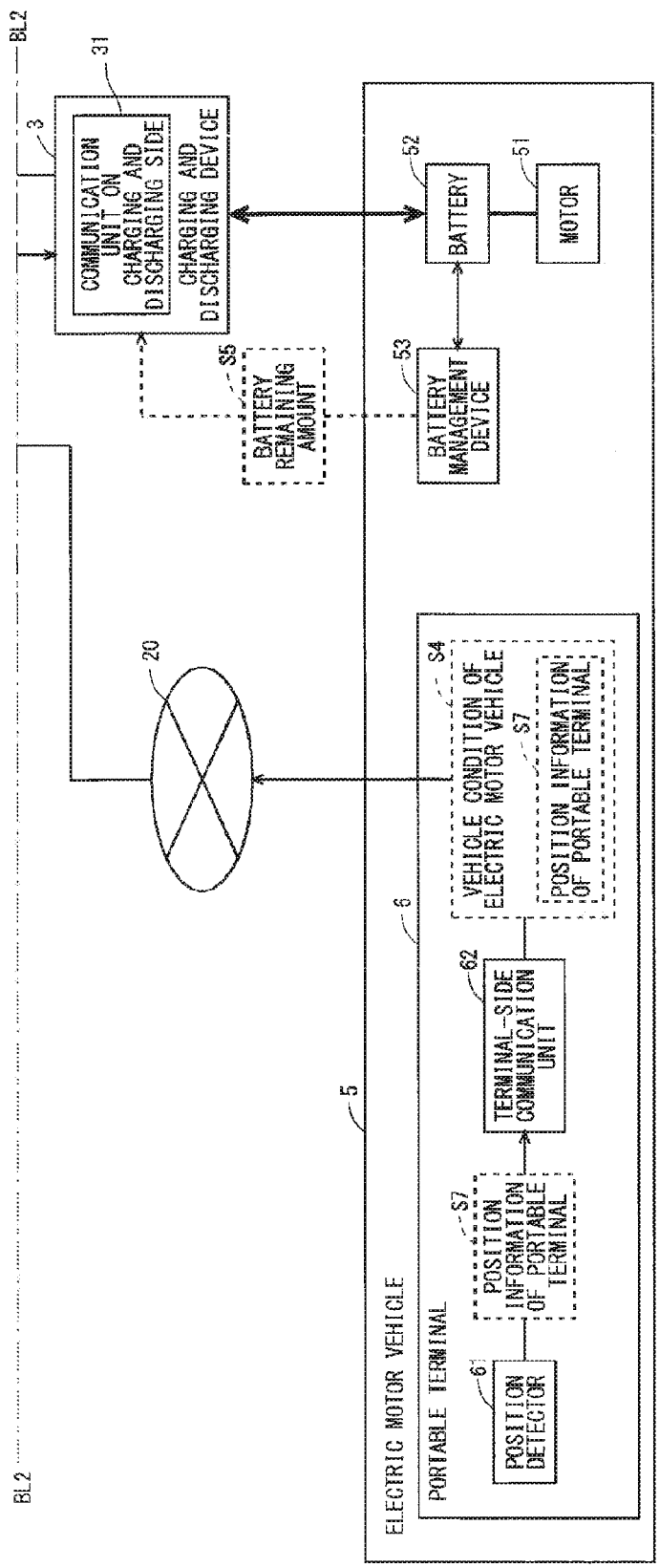
FIG. 11 A block diagram showing the configuration of the customer 1, the EMS 2, the electric motor vehicle 5, and the portable terminal 6 in the electric motor vehicle management system 10A according to the second embodiment of the present invention.

FIGS. 10 and 11 are block diagrams showing a configuration of the customer 1, the EMS 2, the electric motor vehicle 5, and the portable terminal 6 in the electric motor vehicle management system according to a second embodiment of the present invention. FIGS. 10 and 11 are connected to each other at the position of a boundary line BL2. The electric motor vehicle management system according to the present embodiment has the configuration similar to that of the electric motor vehicle management system 10 according to the first embodiment described above. Thus, the same reference signs indicate the same constituent components, and a description applied in common is omitted. In the description below, the electric motor vehicle management system according to the present embodiment is denoted by the reference sign "10A."

An electric motor vehicle management system 10A according to the present embodiment includes the customer 1, the EMS 2, the charging and discharging device 3, the household appliances 4, the electric motor vehicle 5, the portable terminal 6, the communication line 20, and the base station device 8 and the server device 9 that are shown in FIG. 1 described above.

According to the present embodiment, the EMS 2 includes an electric-motor-vehicle energy consumption estimating unit 27. Thus, the EMS 2 includes the electric power usage predicting unit 21, the use plan input unit 22, the EMS-side parameter acquiring unit 23, the vehicle condition receiver 24, the battery charging-and-discharging plan creating unit 25, the EMS-side communication unit 26, and the electric-motor-vehicle energy consumption estimating unit 27. The electric-motor-vehicle energy consumption estimating unit 27 estimates the amount of energy consumed through traveling of electric motor vehicle 5 on the basis of the electric motor vehicle parameter information S3 and the vehicle condition information S4 of the electric motor vehicle 5. In particular, the electric-motor-vehicle energy consumption estimating unit 27 obtains the energy consumption estimated value represented by energy consumption estimated value information S8 through arithmetic operations.

Figure 12:
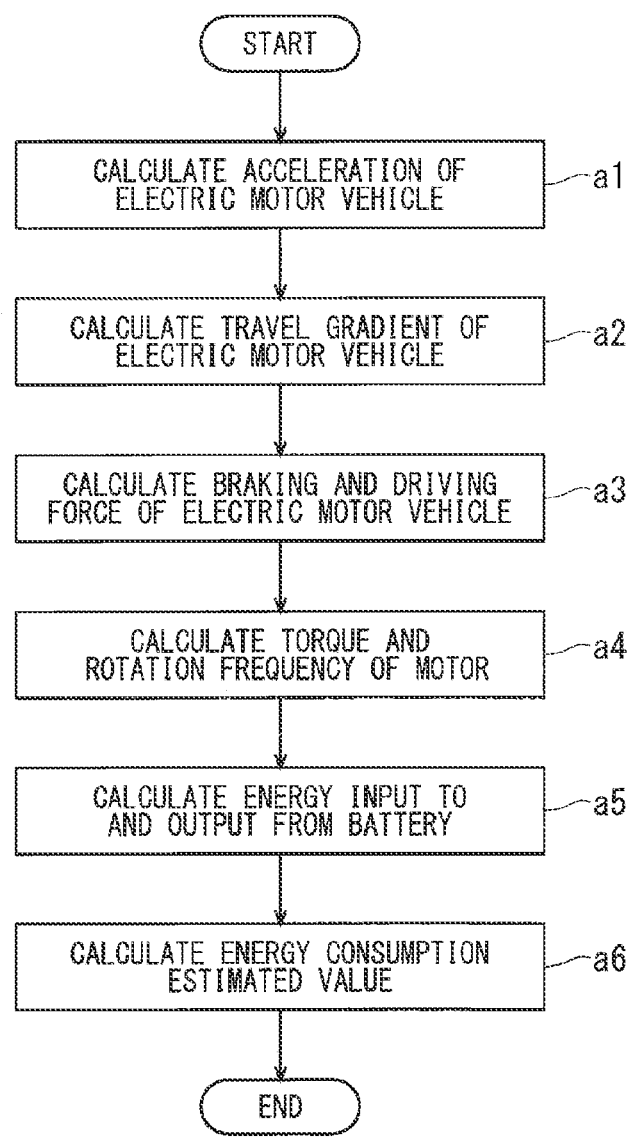
FIG. 12 A flowchart showing procedure for processing computation of an energy consumption estimated value in an electric-motor-vehicle energy consumption estimating unit 27.

FIG. 12 is a flowchart showing procedure for processing computation of an energy consumption estimated value in the electric-motor-vehicle energy consumption estimating unit 27. Each part of the processing in the flowchart shown in FIG. 12 is executed by the electric-motor-vehicle energy consumption estimating unit 27. When the electric-motor-vehicle energy consumption estimating unit 27 is provided with the electric motor vehicle parameter information S3 from the EMS-side parameter acquiring unit 23 and is provided with the vehicle condition information S4 of the electric motor vehicle 5 from the vehicle condition receiver 24, the processing of the flowchart shown in FIG. 12 starts and moves to Step a1.

In Step a1, the electric-motor-vehicle energy consumption estimating unit 27 calculates the acceleration of the electric motor vehicle on the basis of the position information S7 of the portable terminal 6 included in the vehicle condition information S4 of the electric motor vehicle 5. The position information S7 of the portable terminal 6 acquired through the position detector 61 includes the latitude, the longitude, the altitude of the measurement point, the acquisition time, the velocity, and the azimuth. An acceleration Acc of the electric motor vehicle can be obtained in accordance with the expression (1) shown below on the basis of the information on the acquisition time and the velocity most recently acquired through the GPS and the information on the acquisition time and the velocity measured in the previous cycle through the GPS. According to the method for measuring position through the GPS, the data acquisition intervals are extended in, for example, the location beyond the reach of the radio wave signals transmitted from the GPS satellite 7. Thus, the acceleration sensor that is separately provided in the portable terminal may be used to supplement the data of the acceleration Acc of the electric motor vehicle 5.

[Exp. 1]

$$Acc = \frac{Vel_{new} - Vel_{old}}{t_{new} - t_{old}} \quad (1)$$

In Step a2, the electric-motor-vehicle energy consumption estimating unit 27 calculates, as in the case with the acceleration Acc, the travel gradient of the electric motor vehicle 5 on the basis of the position information S7 of the portable terminal 6 included in the vehicle condition information S4 of the electric motor vehicle 5. A travel gradient θ of the electric motor vehicle 5 can be obtained in accordance with the expression (2) shown below on the basis of the information, included in the position information S7 of the portable terminal 6, on the acquisition time and the altitude most recently acquired through the GPS and on the acquisition time and the altitude measured in the previous cycle through the GPS.

As in the calculation of the acceleration Acc of the electric motor vehicle, according to the method for measuring the position through the GPS, the data acquisition intervals are extended in, for example, the location beyond the reach of the radio wave signals transmitted from the GPS satellite 7. Thus, the tilt sensor that is separately provided in the portable terminal may be used to supplement the data of the travel gradient θ of the electric motor vehicle 5.

[Exp. 2]

$$\theta = \frac{Alt_{new} - Alt_{old}}{t_{new} - t_{old}} \quad (2)$$

In Step a3, the electric-motor-vehicle energy consumption estimating unit 27 calculates the braking and driving force of the electric motor vehicle on the basis of the acceleration Acc of the electric motor vehicle obtained in Step a1, the travel gradient θ obtained in Step a2, and a velocity Vel of the electric motor vehicle 5 included in the position information S7 of the portable terminal 6. The calculation of the braking and driving force of the electric motor vehicle is described with reference to the flowchart shown in FIG. 13.

FIG. 13 is a flowchart showing procedure for processing computation of the braking and driving force of the electric motor vehicle in the electric-motor-vehicle energy consumption estimating unit 27. Each part of the processing in the flowchart shown in FIG. 13 is executed by the electric-motor-vehicle energy consumption estimating unit 27. When the processing in Step a2 of the flowchart shown in FIG. 12 ends, the processing of the flowchart shown in FIG. 13 starts and moves to Step b1.

In Step b1, the electric-motor-vehicle energy consumption estimating unit 27 calculates a grade resistance Rs of the electric motor vehicle 5. The grade resistance Rs is the slope-direction component force generated at a time when the electric motor vehicle 5 climbs a slope. The grade resistance Rs can be obtained in accordance with the expression (3) shown below on the basis of a weight m of the electric motor vehicle 5, a gravity acceleration g, and the travel gradient θ of the electric motor vehicle 5.

[Exp. 3]

$$Rs = m \times g \times \sin\theta \quad (3)$$

In Step b2, the electric-motor-vehicle energy consumption estimating unit 27 calculates a rolling resistance Rr. The rolling resistance Rr is primarily the resistance force generated between a tire and a road surface and stands at a value that is unique to each of the tires of different materials, structures, and dimensions. The rolling resistance Rr can be obtained in accordance with the expression (4) shown below on the basis of the weight m of the electric motor vehicle 5, the gravity acceleration g, and a coefficient μr that is unique to the electric motor vehicle 5. The rolling resistance Rr, which is the resistance generated only at a time when a tire rotates, is not generated when the velocity Vel is 0 km/h. That is, the rolling resistance Rr becomes zero (Rr=0) if the velocity Vel is 0 km/h.

[Exp. 4]

$$Rr = m \times g \times \mu r \text{(in the case of } Vel \neq 0) \quad (4)$$

In Step b3, the electric-motor-vehicle energy consumption estimating unit 27 calculates an air resistance R1. The air resistance R1 is the energy loss caused by air, such as frictional force between the vehicle body and the air and the force generated at a time when the vehicle body comes into collision with the air. The air resistance R1 stands at a value proportional to a frontal projected area A of the vehicle body, an air resistance coefficient pa, the square of the velocity Vel and can be obtained in accordance with the expression (5) shown below.

[Exp. 5]

$$R1 = \mu a \times A \times Vel^2 \quad (5)$$

In Step b4, the electric-motor-vehicle energy consumption estimating unit 27 calculates an acceleration resistance Ra. The acceleration resistance Ra is the inertial force generated at a time when the electric motor vehicle 5 accelerates and decelerates. The acceleration resistance Ra stands at a value proportional to the weight m of the electric motor vehicle 5 and the acceleration Acc of the electric motor vehicle 5 and can be obtained in accordance with the expression (6) shown below.

[Exp. 6]

$$Ra = m \times Acc \quad (6)$$

In Step b5, the electric-motor-vehicle energy consumption estimating unit 27 calculates the braking and driving force of the electric motor vehicle. The grade resistance Rs obtained in Step b1, the rolling resistance Rr obtained in Step b2, the air resistance Rl obtained in Step b3, and the acceleration resistance Ra obtained in Step b4 are resistance forces generated along with the anterior-posterior movement of the electric motor vehicle 5 and becomes equal to a braking and driving force Ftrac of the electric motor vehicle 5. Thus, the braking and driving force Ftrac of the electric motor vehicle can be obtain in accordance with the expression (7) shown below.

[Exp. 7]

$$Ftrac = Rs + Rr + Rl + Ra \tag{7}$$

Among the coefficients included in the above expressions (3) to (7), the vehicle weight m of the electric motor vehicle 5, the tire coefficient μr, the frontal projected area A of the vehicle body, and the air resistance coefficient μa are the values that can be uniquely given if the vehicle specification data of the electric motor vehicle 5 is provided. These values are acquired by the EMS-side parameter acquiring unit 23 and are stored as the electric motor vehicle parameter information S3. The gravity acceleration g is the fixed value and is stored as the electric motor vehicle parameter information S3 to be used in calculations.

The above expressions (3) to (7) used in calculations of the braking and driving force of the electric motor vehicle in Step a3 in FIG. 12, i.e., calculations in Steps b1 to b5 in FIG. 13 are formulae used to obtain the anterior-posterior movement of a vehicle and is described in the following reference work.

Reference Work: Society of Automotive Engineer of Japan. "Jidosha kogaku—kiso—[Automotive Engineering—basics—]." Section 2.2 in Chap. 2. 1st ed, Dec. 31, 2002.

Referring back to FIG. 12, in Step a4, the electric-motor-vehicle energy consumption estimating unit 27 calculates the torque and the rotation frequency of the motor. In particular, the electric-motor-vehicle energy consumption estimating unit 27 calculates an output torque Tmtr and a motor rotational speed Nmtr of the motor 51. The braking and driving force Ftrac of the electric motor vehicle described above is the force generated on the tread between the driving wheel (tire) of the electric motor vehicle 5 and the road surface. To be converted into the output torque of the motor, the braking and driving force Ftrac of the electric motor vehicle is converted into a drive shaft torque Trac through the use of a radius r of the tire and divided by a gear ratio G between the drive shaft and the motor. That is, the output torque Tmtr of the motor 51 can be obtained in accordance with the expression (8) shown below.

[Exp. 8]

$$Tmtr = Ttrac \div G = Ftrac \times r \div G \tag{8}$$

To obtain the rotation speed of the motor 51, a wheel speed W is obtained from the velocity Vel of the vehicle and is multiplied by the gear ratio G between the drive shaft and the motor. That is, the rotational speed Nmtr of the motor 51 can be obtained in accordance with the expression (9) shown below.

[Exp. 9]

$$Nmtr = W \times G = \left(\frac{Vel}{2\pi r}\right) \times G \tag{9}$$

Note that the expressions (8) and (9) described above hold true for the case in which a gear sits between the drive shaft and the motor. In a case where the motor 51 is directly connected to the tire, the gear ratio G stands at "1." The gear ratio G may be varied through control in another configuration. If this is the case, the value of the gear ratio G used for arithmetic operations needs to be revised though control. The radius r of the tire and the gear ratio G, which are the values uniquely given depending on the specifications of the electric motor vehicle 5, are acquired by the EMS-side parameter acquiring unit 23 and stored as the electric motor vehicle parameter information S3 to be used in arithmetic operations.

In Step a5, the electric-motor-vehicle energy consumption estimating unit 27 calculates the input and output energy of the battery 52. In particular, the electric-motor-vehicle energy consumption estimating unit 27 obtains energy E input to and output from the battery 52. The energy E can be obtain in accordance with the expression (10) shown below.

[Exp. 10]

$$E = (Tmtr \times Nmtr) \times \eta_{mtr} \times \eta_{inv} \tag{10}$$

In the above expression (10), $\eta_{mtr}$ denotes the efficiency of the motor 51 and $\eta_{inv}$ denotes the efficiency of the inverter connected between the motor 51 and the battery 52. Both the efficiency $\eta_{mtr}$ of the motor 51 and the efficiency $\eta_{inv}$ of the inverter are variables influenced by the motor output torque Tmtr, the motor rotational speed Nmtr, and the direction of input and output of energy. The efficiency $\eta_{mtr}$ of the motor 51 and the efficiency $\eta_{inv}$ of the inverter, which are the values uniquely given depending on the specifications of the electric motor vehicle 5, are acquired by the EMS-side parameter acquisition unit 23 and stored as the electric motor vehicle parameter information S3 to be used in arithmetic operations.

In Step a6, the electric-motor-vehicle energy consumption estimating unit 27 calculates the energy consumption estimated value. In particular, the electric-motor-vehicle energy consumption estimating unit 27 obtains the energy consumption estimated value information S8 representing the estimated value of energy consumption consumed through traveling of the electric motor vehicle 5. The energy consumption estimated value is the sum total of the energy E obtained from the start of measurement till the present time in accordance with the above expression (10) and can be obtained in accordance with the expression (11) shown below.

[Exp. 11]

$$Ec = \sum_{t=0} Et \tag{11}$$

As described above, the electric-motor-vehicle energy consumption estimating unit 27 obtains the energy consumption estimated value information S8 from the vehicle condition information S4 and the electric motor vehicle parameter information S3 of the electric motor vehicle 5.

The electric-motor-vehicle energy consumption estimating unit 27 according to the present embodiment computes only the amount of energy consumed directly by the anterior-posterior movement, or equivalently, the traveling of the electric motor vehicle 5 that forms a large portion of the electric power consumption of the battery 52, and sets the resulting value as the energy consumption estimated value represented by the energy consumption estimated value information S8. Alternatively, the electric power consumption of the auxiliaries that are unrelated to the traveling may be taken into consideration in order to improve the accuracy of estimation of the energy consumption estimated value of the electric motor vehicle 5.

The electric power consumption of, for example, the air conditioner and the AV equipment attached to the electric motor vehicle 5 is basically assumed to be constant, and thus, the amount of electric power consumption that is proportional to the operating time is preferably added to the energy consumption estimated value. The electric power consumption of the windshield wiper, the lighting, and the like of the electric motor vehicle 5 is assumed to be influenced by the environments, such as the rainy weather or the nighttime, and thus, the amount of electric power consumption that is proportional to the operating time is preferably added to the energy consumption estimated value with consideration given to the environmental conditions.

In producing the battery charging-and-discharging plan information S6 for attaining two objectives of "leveling electric power demand from the customer 1" and "securing electric power required for traveling of the electric motor vehicle 5" in the first embodiment described above, the battery charging-and-discharging plan creating unit 25 according to the present embodiment performs planning through the additional use of the energy consumption estimated value information S8. The following describes the operation of the battery charging-and-discharging plan creating unit 25 reflecting the energy consumption estimated value information S8.

Figure 14:
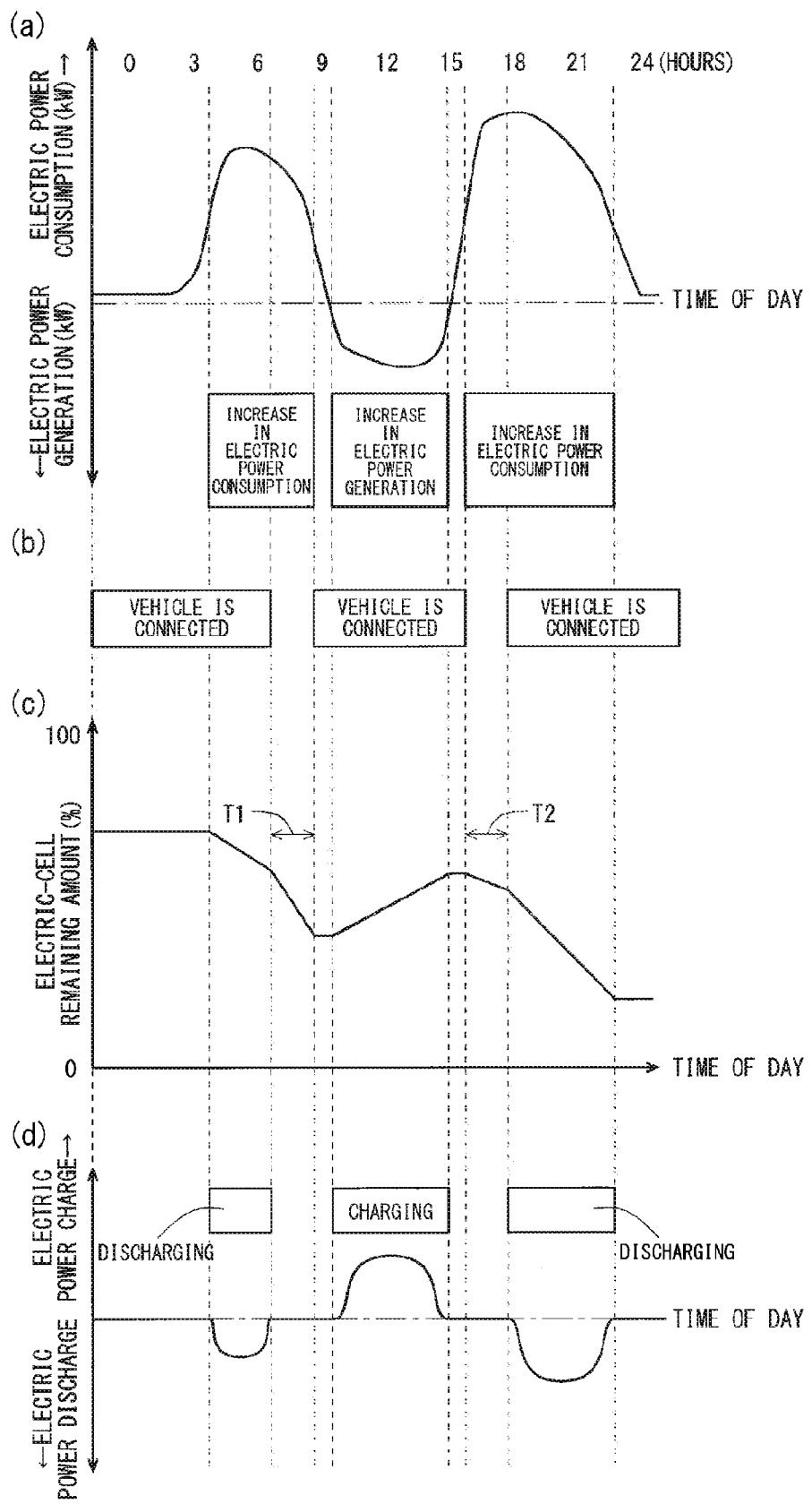
FIG. 14 A view showing an example of results of predictions on electric power usage in the customer 1, an example of a use plan of the electric motor vehicle 5, an example of estimation results of changes in battery remaining amount, and an example of a battery charging-and-discharging plan before revision in a case where a user goes out in the electric motor vehicle 5.

FIG. 14 is a view showing an example of results of predictions on electric power usage in the customer 1, an example of the use plan of the electric motor vehicle 5, an example of estimation results of changes in the battery remaining amount, and an example of the battery charging-and-discharging plan before revision while the user goes out in the electric motor vehicle 5.

Part (a) of FIG. 14 shows an example of results of predictions on electric power usage in the customer 1 represented by the electric power usage prediction information S1 for the customer 1. Part (b) of FIG. 14 shows an example of the use plan of the electric motor vehicle 5 represented by the use plan information S2 of the electric motor vehicle 5. Part (c) of FIG. 14 shows an example of estimation results of changes in the battery remaining amount. Part (d) of FIG. 14 shows an example of the battery charging-and-discharging plan represented by the battery charging-and-discharging plan information S6 before revision. Part (d) of FIG. 14 indicates the time period over which electricity should be discharged from the electric motor vehicle 5 to the customer 1 along with the time period over which the electric motor vehicle 5 should be charged. Part (a) of FIG. 14 corresponds to part (a) of FIG. 8, part (b) of FIG. 14 corresponds to part (b) of FIG. 8, and part (d) of FIG. 14 corresponds to part (c) of FIG. 8.

In parts (a) to (d) of FIG. 14, the lateral axis indicates the time of day (hours). In part (a) of FIG. 14, the vertical axis above an alternate long and short dash line that is horizontal relative to the lateral axis indicates the electric power consumption (kW) and the vertical axis below the alternate long and short dash line indicates the electric power generation (kW). In part (c) of FIG. 14, the vertical axis indicates the electric-cell remaining amount (%) that is the battery remaining amount. In part (d) of FIG. 14, the vertical axis above an alternate long and short dash line that is horizontal relative to the lateral axis indicates electric power charge and the vertical axis below the alternate long and short dash line indicates electric power discharge.

FIG. 14 shows the operation of the battery charging-and-discharging plan creating unit 25 while the user goes out in the electric motor vehicle 5. Assume that the battery charging-and-discharging plan creating unit 25 has already produced, as in the first embodiment, the battery charging-and-discharging plan information S6 for attaining two objectives of "leveling electric power demand from the customer 1" and "securing electric power required for traveling of the electric motor vehicle 5" before the departure of the electric motor vehicle 5.

As in the first embodiment, according to the present embodiment, the user operates the software installed on the portable terminal 6 while going out in the electric motor vehicle 5. Thus, the vehicle condition receiver 24 receives, from the portable terminal 6 of the user, the vehicle condition information S4 of the electric motor vehicle 5 including the position information S7 of the portable terminal 6. Through the electric-motor-vehicle energy consumption estimating unit 27, the EMS 2 calculates, as the energy consumption estimated value represented by the energy consumption estimated value information S8, the amount of electric power estimated to be consumed by the electric motor vehicle 5 that is currently out on the road on the basis of the position information S7 of the portable terminal 6 included in the vehicle condition information S4 of the electric motor vehicle 5.

The following describes the operation of the battery charging-and-discharging plan creating unit 25 while the electric motor vehicle 5 is connected with the charging and discharging device 3. As in the first embodiment, the battery charging-and-discharging plan creating unit 25 according to the present embodiment produces the battery charging-and-discharging plan information S6 for attaining two objectives of "leveling electric power demand from the customer 1" and "securing electric power required for traveling of the electric motor vehicle 5."

In creating a plan with the objective of "leveling electric power demand from the customer 1," the battery charging-and-discharging plan creating unit 25 according to the present embodiment extracts, from the electric power usage prediction information S1 for the customer 1, the time period over which the electric power consumption increases and the time period over which the electric power generation increases in the customer 1 as in the first embodiment. On the basis of the extracted time periods and the time periods over which the electric motor vehicle 5 is connected with the EMS 2 according to the use plan information S2 of the electric motor vehicle 5, the battery charging-and-discharging plan creating unit 25 extracts the time period over which electricity should be discharged from the electric motor vehicle 5 to the customer 1 and the time period over which the electric motor vehicle 5 should be charged.

The battery charging-and-discharging plan creating unit 25 according to the present embodiment performs the processing of predicting changes in the battery remaining amount throughout the day besides the processing which is the same as the processing executed by the battery charging-and-discharging plan creating unit 25 according to the first embodiment. In particular, the battery charging-and-discharging plan creating unit 25 predicts changes in the battery remaining amount throughout the day including the period after the return on the basis of the battery remaining amount information S5 of the electric motor vehicle 5 acquired from the charging and discharging device 3 and on the amount of electric power consumption included in the use plan information S2 of the electric motor vehicle 5.

In the example shown in part (b) of FIG. 14, the electric motor vehicle 5 is unconnected with the charging and discharging device 3, i.e., the user goes out in the electric motor vehicle 5 during a first leave time period T1 from 6 hours to 8 hours and a second leave time period T2 from 16 hours to 18 hours. The battery charging-and-discharging plan creating unit 25 estimates, on the basis of the use plan information S2 of the electric motor vehicle 5, the battery remaining amount that is the remaining amount of the battery 52 of the electric motor vehicle 5 at the end point of the first leave time period T1 and the end point of the second leave time period T2, in other words, at the time of return.

After that, the battery charging-and-discharging plan creating unit 25 obtains the battery charging-and-discharging plan information S6 on the basis of the previously extracted time period over which electricity should be discharged from the electric motor vehicle 5 to the customer 1 and the previously extracted time period over which the electric motor vehicle 5 should be charged. The battery charging-and-discharging plan information S6 includes the values of electric power charge and electric power discharge.

As in the first embodiment, the electric power charge and the electric power discharge included in the resulting battery charging-and-discharging plan information S6 stand at the values obtained by subjecting the values of the "amount of electric power consumption and electric power generation which the customer 1 wants to reduce" computed from the electric power usage prediction information S1 for the customer 1 to the limitations of the electric motor vehicle parameter information S3. In particular, these values are subjected to the limitations including the capability of the battery 52 in the electric motor vehicle parameter information S3, the battery remaining amount information S5, and the conversion capability of the electric power converter included in the charging and discharging device 3. The capability of the battery 52 is represented by the total capacity, the available capacity range, and the current limitation of the battery 52.

As in the first embodiment, in creating a plan with the objective of "securing electric power required for traveling of the electric motor vehicle 5," the battery charging-and-discharging plan creating unit 25 corrects the battery charging-and-discharging plan information S6. In particular, the battery charging-and-discharging plan creating unit 25 corrects, on the basis of the time of departure of the electric motor vehicle 5 and the amount of electric power consumed through traveling according to the use plan information S2 of the electric motor vehicle 5, the battery charging-and-discharging plan information S6 that has been planned and created with the objective of "leveling the electric power demand from the customer 1" such that the amount of electric power required for the traveling will be secured in the battery 52 before the time of departure of the electric motor vehicle 5.

For the correction of the battery charging-and-discharging plan information S6, in a case where the amount of electric power required for the traveling cannot be secured in the battery 52 before the time of departure of the electric motor vehicle 5 according to a revision made only to the amount of charging and discharging that has been planned in the first place for "leveling the electric power demand from the customer 1," a new schedule for charging is produced and added to the battery charging-and-discharging plan information S6.

The following describes the operation of the battery charging-and-discharging plan creating unit 25 while the user goes out in the electric motor vehicle 5. FIG. 15 is a view showing an example of results of predictions on electric power usage in the customer 1, an example of the use plan of the electric motor vehicle 5, an example of estimation results of changes in the battery remaining amount, and an example of the battery charging-and-discharging plan after revision while the user goes out in the electric motor vehicle 5.

Part (a) of FIG. 15 shows an example of results of predictions on electric power usage in the customer 1 represented by the electric power usage prediction information S1 for the customer 1. Part (b) of FIG. 15 shows an example of the use plan of the electric motor vehicle 5 represented by the use plan information S2 of the electric motor vehicle 5. Part (c) of FIG. 15 shows an example of estimation results of changes in the battery remaining amount. Part (d) of FIG. 15 shows an example of the battery charging-and-discharging plan represented by the battery charging-and-discharging plan information S6 after revision. Part (d) of FIG. 15 indicates the time period over which electricity should be discharged from the electric motor vehicle 5 to the customer 1 along with the time period over which the electric motor vehicle 5 should be charged. Part (a) of FIG. 15 corresponds to part (a) of FIG. 8 and part (b) of FIG. 15 corresponds to part (b) of FIG. 8.

In part (a) to (d) of FIG. 15, the lateral axis indicates the time of day (hours). In part (a) of FIG. 15, the vertical axis above an alternate long and short dash line that is horizontal relative to the lateral axis indicates the electric power consumption (kW) and the vertical axis below the alternate long and short dash line indicates the electric power generation (kW). In part (c) of FIG. 15, the vertical axis indicates the electric-cell remaining amount (%) that is the battery remaining amount. In part (d) of FIG. 15, the vertical axis above an alternate long and short dash line that is horizontal relative to the lateral axis indicates electric power charge and the vertical axis below the alternate long and short dash line indicates electric power discharge.

Assume that the battery charging-and-discharging plan creating unit 25 has already produced the battery charging-and-discharging plan information S6 for attaining two objectives of "leveling electric power demand from the customer 1" and "securing electric power required for traveling of the electric motor vehicle 5" before the departure of the electric motor vehicle 5.

When the energy consumption estimated value estimated by the electric-motor-vehicle energy consumption estimating unit 27 and represented by the estimated value information S8 significantly diverges from the amount of electric power consumption included in the use plan information S2 of the electric motor vehicle 5, the battery charging-and-discharging plan creating unit 25 reflects the energy consumption estimated value on the intraday changes in the battery remaining amount that have been previously predicted and revises the intraday changes in the battery remaining amount.

In part (c) of FIG. 15, as an example, the intraday changes in the battery remaining amount that have been previously predicted are indicated by the solid line given the reference sign "11" and the intraday changes in the battery remaining amount after revision are indicated by the alternate long and two short dashes line given the reference sign "12." For example, assume that the intraday changes in the battery remaining amount that have been previously predicated are as shown by the solid line given the reference sign "11" in part (c) of FIG. 15. In this situation, an estimated increase in the energy consumption through the traveling of the electric motor vehicle 5 during the second leave time period T2 leads to predictions that the battery remaining amount at the time of return, which is the end point of the second leave time period T2, will become significantly smaller than the initial predicted value. Consequently, the estimated value of the battery remaining amount declines as shown by the alternate long and two short dashes line given the reference sign "12."

Then, the battery charging-and-discharging plan creating unit 25 produces the battery charging-and-discharging plan information S6 again on the basis of the revised intraday changes in the battery remaining amount. In a case where the amount of energy consumption during the actual traveling is estimated to become greater than the amount of energy consumption during traveling that has been previously planned in the use plan information S2 of the electric motor vehicle 5 because of, for example, a wrong route taken by the user or traffic conditions, the battery charging-and-discharging plan information S6 is revised before the return of the electric motor vehicle 5 such that, for example, the electric power discharge after the return is set lower as shown in part (d) of FIG. 15. This allows the EMS 2 to decide, at an early stage, that the electric power discharge after the return of electric motor vehicle 5 will not measure up the previous plan, and thus, the EMS 2 can reduce the electric power usage in the other household appliances 4 at an early stage.

Along with this, the battery charging-and-discharging plan creating unit 25 according to the present embodiment is also capable of revising the battery charging-and-discharging plan information S6 in response to a revision made to the time of return through the use of the position information S7 of the portable terminal 6.

As described above, in the electric motor vehicle management system 10A according to the second embodiment of the present invention, the electric-motor-vehicle energy consumption estimating unit 27 obtains the energy consumption estimated value represented by the energy consumption estimated value information S8 through arithmetic operations on the basis of the vehicle condition information S4 and the electric motor vehicle parameter information S3 of the electric motor vehicle 5 and the battery charging-and-discharging plan creating unit 25 obtains the battery charging-and-discharging plan information S6 through arithmetic operations through the use of the energy consumption estimated value information S8 acquired from the electric-motor-vehicle energy consumption estimating unit 27. Thus, even if the initially-predicted battery remaining amount at the time of return of electric motor vehicle 5 changes while the electric motor vehicle 5 is on the road, a revision can be promptly made to the battery charging-and-discharging plan represented by the battery charging-and-discharging plan information S6 of the electric motor vehicle 5. Consequently, according to the present embodiment, a revision can be made in advance to the plan of the amount of electric power charge and discharge, leading to the sophistication of the battery charging-and-discharging plan information S6.

Third Embodiment

Figure 16:
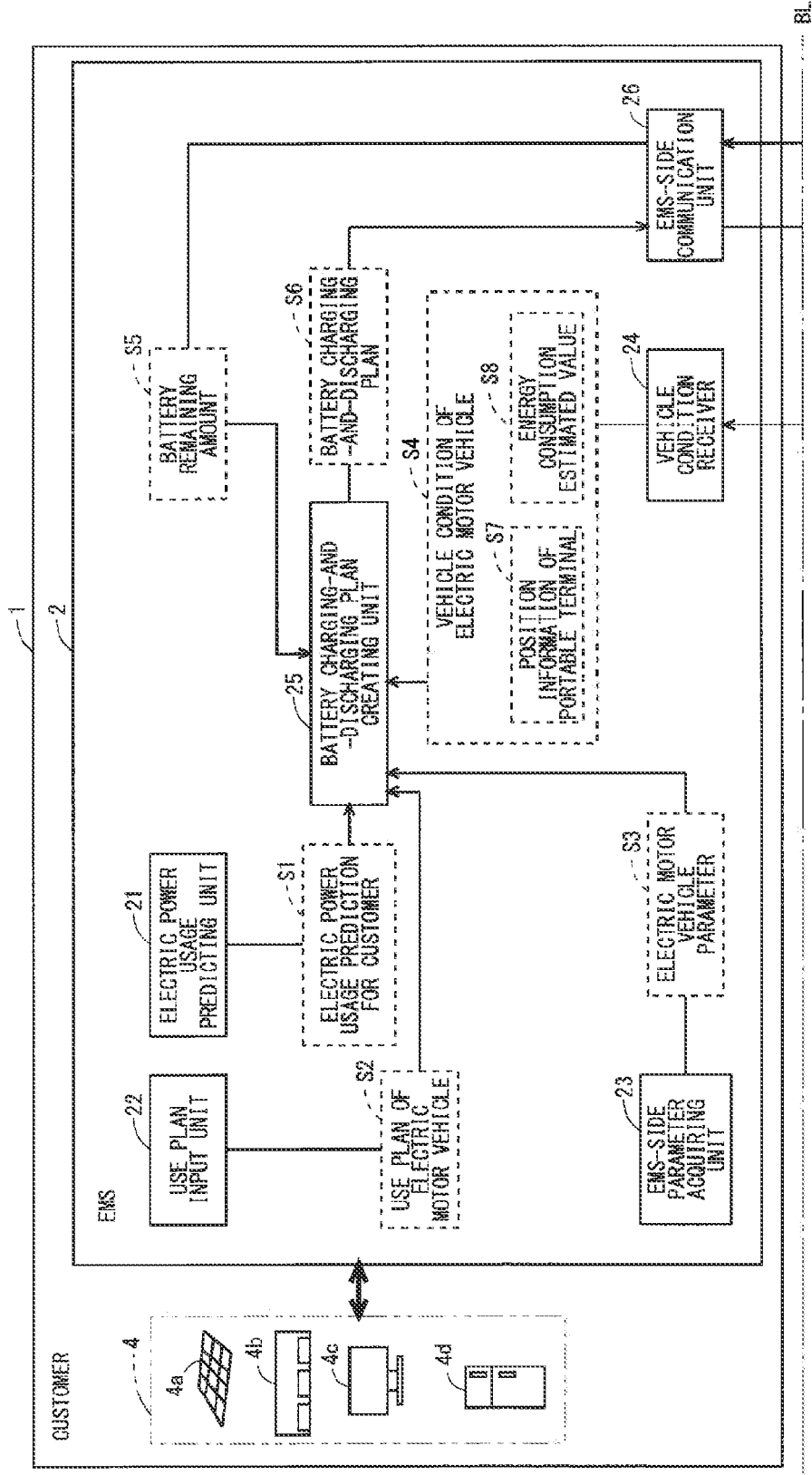
FIG. 16 A block diagram showing a configuration of the customer 1, the EMS 2, the electric motor vehicle 5, and the portable terminal 6 in an electric motor vehicle management system 10B according to a third embodiment of the present invention.
Figure 17:
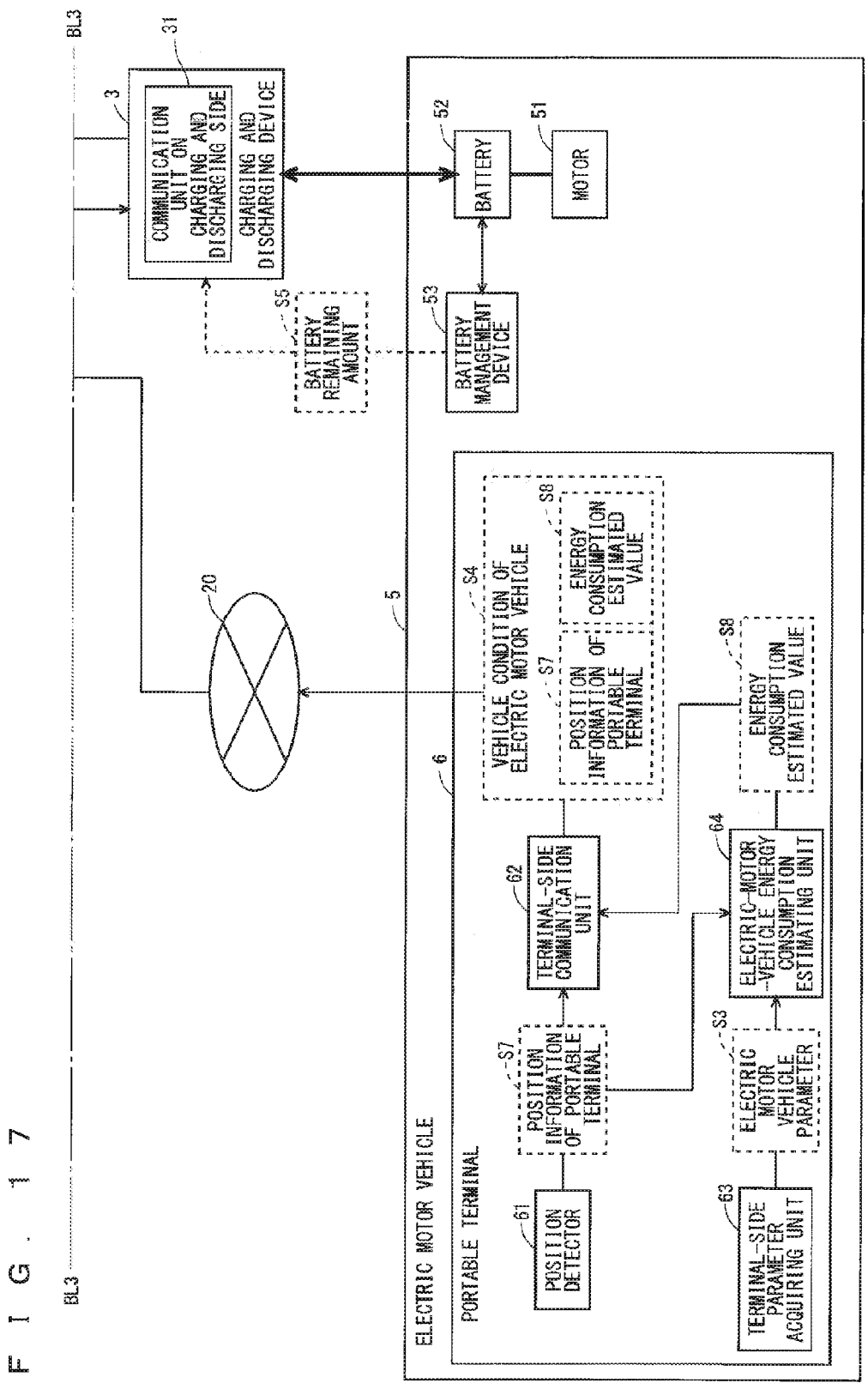
FIG. 17 A block diagram showing the configuration of the customer 1, the EMS 2, the electric motor vehicle 5, and the portable terminal 6 in the electric motor vehicle management system 10B according to the third embodiment of the present invention.

FIGS. 16 and 17 are block diagrams showing a configuration of the customer 1, the EMS 2, the electric motor vehicle 5, and the portable terminal 6 in the electric motor vehicle management system according to a third embodiment of the present invention. FIGS. 16 and 17 are connected to each other at the position of a boundary line BL3. The electric motor vehicle management system according to the present embodiment has the configuration similar to that of the electric motor vehicle management system 10 according to the first embodiment described above. Thus, the same reference signs indicate the same constituent components, and a description applied in common is omitted. In the description below, the electric motor vehicle management system according to the present embodiment is denoted by the reference sign "10B."

An electric motor vehicle management system 10B according to the present embodiment includes the customer 1, the EMS 2, the charging and discharging device 3, the household appliances 4, the electric motor vehicle 5, the portable terminal 6, the communication line 20, and the base station device 8 and the server device 9 that are shown in FIG. 1 described above.

According to the present embodiment, the portable terminal 6 includes a terminal-side parameter acquiring unit 63 and an electric-motor-vehicle energy consumption estimating unit 64. Thus, the portable terminal 6 includes the position detector 61, the terminal-side communication unit 62, the terminal-side parameter acquiring unit 63, and the electric-motor-vehicle energy consumption estimating unit 64. The terminal-side parameter acquiring unit 63 and the electric-motor-vehicle energy consumption estimating unit 64 provide, in the portable terminal 6, the same functions as those of the EMS-side parameter acquiring unit 23 and the electric-motor-vehicle energy consumption estimating unit 27 of the EMS 2 according to the second embodiment and obtain the energy consumption estimated value represented by the energy consumption estimated value information S8 through arithmetic operations.

The terminal-side communication unit 62 transmits, as the vehicle condition information S4 of the electric motor vehicle 5, the position information S7 of the portable terminal 6 acquired by the position detector 61 and the energy consumption estimated value information S8 representing the energy consumption estimated value obtained through arithmetic operations performed by the electric-motor-vehicle energy consumption estimating unit 64 to the EMS 2 through the communication line.

The battery charging-and-discharging plan creating unit 25 of the EMS 2 recalculates the battery charging-and-discharging plan information S6 at intervals of several minutes to several hours. Under the present circumstances, recalculations of the charging-and-discharging plan information S6 with periodicity below the above-described intervals are, in many cases, not tracked by the control for the household appliances 4 receiving commands from the EMS 2. To improve the tracking properties, the EMS 2 and the household appliances 4 each require a microcomputer having higher arithmetic operation capability and an actuator having higher controllability. Moreover, the high-speed communication means needs to be secured for the communication between the EMS 2 and each of the household appliances 4. Consequently, being weighed against the initial introduction cost of the EMS 2 and the household appliances 4 adapted to the EMS 2, the effects of power saving achieved by leveling electric power demand from the customer 1 are unfortunately reduced.

The calculation interval is desirably set at about 1 second in order to maintain a certain accuracy for calculations of the acceleration of the electric motor vehicle 5 (Step a1 in FIG. 12) and calculations of the travel gradient of the electric motor vehicle 5 (Step a2 in FIG. 12) in the arithmetic operations of the energy consumption estimated value indicating the energy consumption estimated value information S8 of the electric motor vehicle 5. The reason for this is as follows. When the user of the electric motor vehicle stops or accelerates the vehicle again, for example, at a light, the acceleration and deceleration take about 5 seconds to about 20 seconds. Therefore, the calculation interval is required to be set at about 1 second in order to estimate the energy consumption through acceleration and deceleration.

According to the configuration of the second embodiment described above, the electric-motor-vehicle energy consumption estimating unit 27 of the EMS 2 obtains, through arithmetic operations, the energy consumption estimated value represented by the energy consumption estimated value information S8 of the electric motor vehicle 5, and therefore, the portable terminal 6 needs to transmit the vehicle condition information S4 of the electric motor vehicle 5 to the EMS 2 at short intervals required by the electric-motor-vehicle energy consumption estimating unit 27 in order to secure the accuracy of arithmetic operations for obtaining the energy consumption estimated value of the electric motor vehicle 5. To extend the intervals of transmission from the portable terminal 6 to the EMS 2, the portable terminal 6 needs to collectively send several batches of acquired data at once. If this is the case, a batch of transmitted data increases proportionately with the transmission interval.

According to the configuration of the electric motor vehicle management system 10B in the third embodiment of the present invention, meanwhile, the electric-motor-vehicle energy consumption estimating unit 64 of the portable terminal 6 obtains, through arithmetic operations, the energy consumption estimated value represented by the energy consumption estimated value information S8 of the electric motor vehicle 5. This allows the terminal-side communication unit 62 to transmit, without being influenced by the arithmetic operation intervals in the electric-motor-vehicle energy consumption estimating unit 64, the vehicle condition information S4 of the electric motor vehicle 5 including the energy consumption estimated value that is the result of the arithmetic operations by the electric-motor-vehicle energy consumption estimating unit 27 at intervals required by the battery charging-and-discharging plan creating unit 25.

Thus, the terminal-side communication unit 62 of the portable terminal 6 can extend the communication intervals between transmissions of the vehicle condition information S4 of the electric motor vehicle 5 to the vehicle condition receiver 24 of the EMS 2. Moreover, the amount of communication can be reduced.

The EMS 2 according to the present embodiment includes the electric power usage predicting unit 21, the use plan input unit 22, the EMS-side parameter acquiring unit 23, the vehicle condition receiver 24, the battery charging-and-discharging plan creating unit 25, and the EMS-side communication unit 26.

The vehicle condition information S4 of the electric motor vehicle 5 received by the vehicle condition receiver 24 according to the present embodiment includes the position information S7 of the portable terminal 6 and the energy consumption estimated value information S8 of the electric motor vehicle 5. The battery charging-and-discharging plan creating unit 25 performs arithmetic operations as in the second embodiment on the basis of the vehicle condition information S4 of the electric motor vehicle 5 received by the vehicle condition receiver 24 and obtains the battery charging-and-discharging plan information S6 through the arithmetic operations.

As described above, in the electric motor vehicle management system 10B according to the third embodiment of the present invention, the energy consumption estimated value represented by the energy consumption estimated value information S8 is obtained through arithmetic operations performed by the electric-motor-vehicle energy consumption estimating unit 64 of the portable terminal 6 on the basis of the vehicle condition information S4 and the electric motor vehicle parameter information S3 of the electric motor vehicle 5. The battery charging-and-discharging plan information S6 is obtained from the energy consumption estimated value information S8 acquired from the electric-motor-vehicle energy consumption estimating unit 64 through arithmetic operations performed by the battery charging-and-discharging plan creating unit 25. Consequently, even if the battery remaining amount at the time of return changes while the electric motor vehicle 5 is on the road, the battery charging-and-discharging plan information S6 of the electric motor vehicle 5 can be revised.

Thus, as in the second embodiment, a revision can be made in advance to the plan of the amount of electric power charge and discharge in the present embodiment, leading to the sophistication of the battery charging-and-discharging plan information S6.

Although the electric motor vehicle management system 10A according to the second embodiment is configured to estimate the energy consumption of the electric motor vehicle 5 through the EMS 2, the electric motor vehicle management system 10B according to the present embodiment is configured to estimate the energy consumption through the portable terminal 6. This can further reduce the amount of communication between the portable terminal 6 and the EMS 2 through the communication line 20, such as the public wireless channel or the internet connection provided by the communication carrier.

Fourth Embodiment

Figure 18:
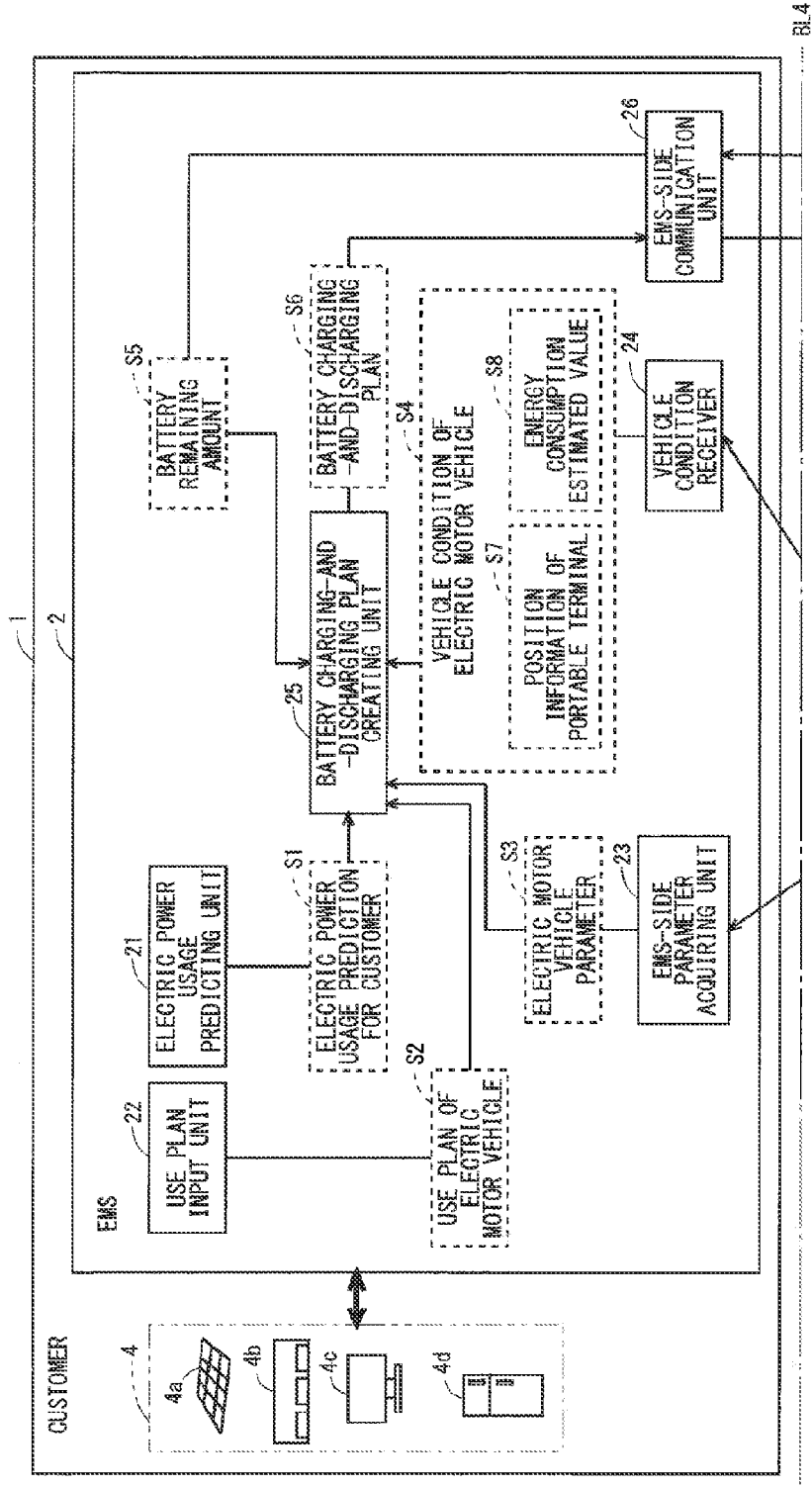
FIG. 18 A block diagram showing a configuration of the customer 1, the EMS 2, the electric motor vehicle 5, the portable terminal 6, and a server device 9 in an electric motor vehicle management system 10C according to a fourth embodiment of the present invention.
Figure 19:
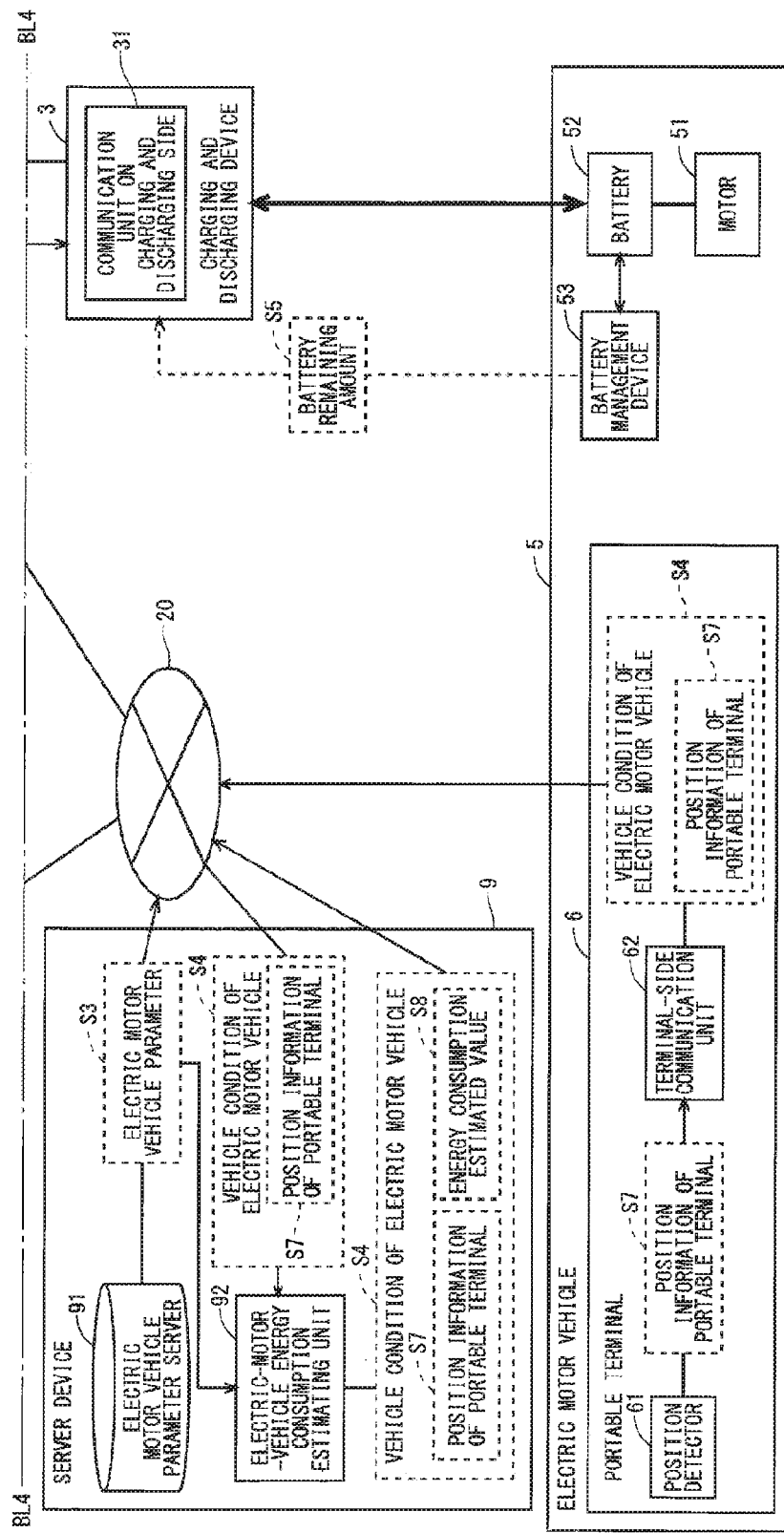
FIG. 19 A block diagram showing the configuration of the customer 1, the EMS 2, the electric motor vehicle 5, the portable terminal 6, and the server device 9 in the electric motor vehicle management system 10C according to the fourth embodiment of the present invention.

FIGS. 18 and 19 are block diagrams showing a configuration of the customer 1, the EMS 2, the electric motor vehicle 5, the portable terminal 6, and the server device 9 in the electric motor vehicle management system according to a fourth embodiment of the present invention. FIGS. 18 and 19 are connected to each other at the position of a boundary line BL4. The electric motor vehicle management system according to the present embodiment has the configuration similar to that of the electric motor vehicle management system 10 according to the first embodiment described above. Thus, the same reference signs indicate the same constituent components, and a description applied in common is omitted. In the description below, the electric motor vehicle management system according to the present embodiment is denoted by the reference sign "10C."

An electric motor vehicle management system 10C according to the present embodiment includes the customer 1, the EMS 2, the charging and discharging device 3, the household appliances 4, the electric motor vehicle 5, the portable terminal 6, the server device 9, the communication line 20, and the base station device 8 that is shown in FIG. 1 described above.

In the present embodiment, the following particularly describes the server device 9, the terminal-side communication unit 62 in the portable terminal 6 that transmits the vehicle condition information S4 of the electric motor vehicle 5 to the server device 9, and the vehicle condition receiver 24 that receives the vehicle condition information S4 of the electric motor vehicle 5 transmitted from the server device 9.

According to the second embodiment described above, the vehicle condition information S4 of the electric motor vehicle 5 is transmitted to the EMS 2 through the communication line 20 provided by the communication carrier. According to the present embodiment, the vehicle condition information S4 of the electric motor vehicle 5 is transmitted to the server device 9 by the terminal-side communication unit 62 through the communication line 20 provided by the communication carrier.

The server device 9 includes an electric motor vehicle parameter server 91 that prestores the electric motor vehicle parameter information S3 for a plurality of electric motor vehicles including the electric motor vehicle 5, allowing for retrieval of the electric motor vehicle parameter information S3 of the electric motor vehicle 5. The server device 9 further includes an electric-motor-vehicle energy consumption estimating unit 92 that estimates the energy consumption estimated value information S8 of the electric motor vehicle 5. The electric-motor-vehicle energy consumption estimating unit 92 estimates the energy consumption estimated value information S8 of the electric motor vehicle 5 from the electric motor vehicle parameter information S3 of the electric motor vehicle 5 and from the vehicle condition information S4 of the electric motor vehicle 5 that includes the position information S7 of the portable terminal 6 and is received from the portable terminal 6.

The electric motor vehicle parameter information S3 of the electric motor vehicle 5 is estimated in the electric-motor-vehicle energy consumption estimating unit 92 as in the electric-motor-vehicle energy consumption estimating unit 27 according to the second embodiment and the electric-motor-vehicle energy consumption estimating unit 64 according to the third embodiment, and thus, a description thereof is omitted.

The vehicle condition receiver 24 according to the present embodiment receives, from the server device 9, the energy consumption estimated value information S8 that is the estimation result provided by the electric-motor-vehicle energy consumption estimating unit 92 and the vehicle condition information S4 of the electric motor vehicle 5 including the position information S7 of the portable terminal 6.

The battery charging-and-discharging plan represented by the battery charging-and-discharging plan information S6 is obtained through arithmetic operations in the battery charging-and-discharging plan creating unit 25 of the EMS 2 as in the second embodiment, and thus, a description thereof is omitted.

As described above, in the electric motor vehicle management system 10C according to the present embodiment, which has the configuration of the electric motor vehicle management system 10 according to the first embodiment, the server device 9 further includes the electric-motor-vehicle energy consumption estimating unit 92 that estimates the energy consumption estimated value information S8 from the vehicle condition information S4 and the electric motor vehicle parameter information S3 of the electric motor vehicle 5. The battery charging-and-discharging plan creating unit 25 obtains the battery charging-and-discharging plan represented by the battery charging-and-discharging plan S6 through arithmetic operations through the use of the energy consumption estimated value information S8 acquired from the electric-motor-vehicle energy consumption estimating unit 92. Consequently, even if the battery remaining amount at the time of return changes while the electric motor vehicle 5 is on the road, the battery charging-and-discharging plan represented by the battery charging-and-discharging plan information S6 of the electric motor vehicle 5 can be revised.

Although the first embodiment is only capable of handling the revisions of the start time for charging and discharging, the present embodiment is capable of making a revision in advance to the plan of the amount of electric power charge and discharge as in the second and third embodiments. This leads to to the sophistication of the battery charging-and-discharging plan represented by the battery charging-and-discharging plan information S6.

According to the present embodiment, the processing through the electric-motor-vehicle energy consumption estimating unit, which has been performed in the EMS 2 or the portable terminal 6 according to the second and third embodiments, is performed in the server device 9. This can reduce the arithmetic operation loads for both the EMS 2 and the portable terminal 6 even if the arithmetic operations performed through the electric-motor-vehicle energy consumption estimating unit become sophisticated in terms of contents.

The server device 9 in the present embodiment is not necessarily provided by the manufacturer of the EMS 2 and may be provided by the manufacturer of the electric motor vehicle 5. This eliminates the necessity for the manufacturer of the EMS 2 to provide the electric-motor-vehicle energy consumption predicting units adapted to every one of the electric motor vehicles on the market and to identify the electric motor vehicle parameter for use in estimation of the electric-motor-vehicle energy consumption. Such adaptation can be entrusted to the provider of the server device 9, resulting in the reduced number of development man-hours.

If the server device 9 is provided by the manufacturer of the electric motor vehicle 5, the energy consumption estimated value can be obtained through arithmetic operations based on detailed parameter of the electric motor vehicle 5 that is normally undisclosed to the public, such as the efficiency $\eta_{mtr}$ of the motor 51 included in the expression (10) described above and the efficiency $\eta_{inv}$ of the inverter connected between the motor 51 and the battery 52. This allows the EMS 2 to improve the accuracy of its planning of the battery charging-and-discharging plan represented by the battery charging-and-discharging plan information S6.

Likewise, in a case where the server device 9 is provided by the manufacturer of the electric motor vehicle 5, the manufacturer of the electric motor vehicle 5 can employ a configuration that confines, within the server device 9, the details of the electric-motor-vehicle energy consumption estimating unit 92 incorporating the arithmetic operation method for obtaining the energy consumption estimated value that reflects the electric-motor vehicle parameter information S3 which should be kept as a design secret and not be disclosed to other companies in the same industry and the detailed control logic which should not to be let out, thereby providing the EMS 2 with only the energy consumption estimated value information S8 representing the energy consumption estimated value that is the result of arithmetic operations. This eliminates the necessity for the manufacturer of the electric motor vehicle 5 to disclose the inside information on the electric motor vehicle 5 and smooths the path to the participation in the electric motor vehicle management system under the present scheme.

The EMS-side parameter acquiring unit 23 according to the present embodiment may be configured to acquire the electric motor vehicle parameter information S3 from the electric motor vehicle parameter server 91 of the server device 9. If this is the case, all of the parameters unique to the electric motor vehicle 5 can be brought together in the electric motor vehicle parameter server 91 of the server device 9. Even in a situation that requires a revision of the electric motor vehicle parameter needed for arithmetic operations in the EMS 2 for an electric motor vehicle that has already been put on the market, the new electric motor vehicle parameter information S3 can be distributed to all of the EMSs 2 on the market as long as the EMS-side parameter acquiring units 23 of the EMSs 2 are set to acquire the electric motor vehicle parameter information S3 in the electric motor vehicle parameter servers 91 in a regular update cycle.

Fifth Embodiment

Figure 20:
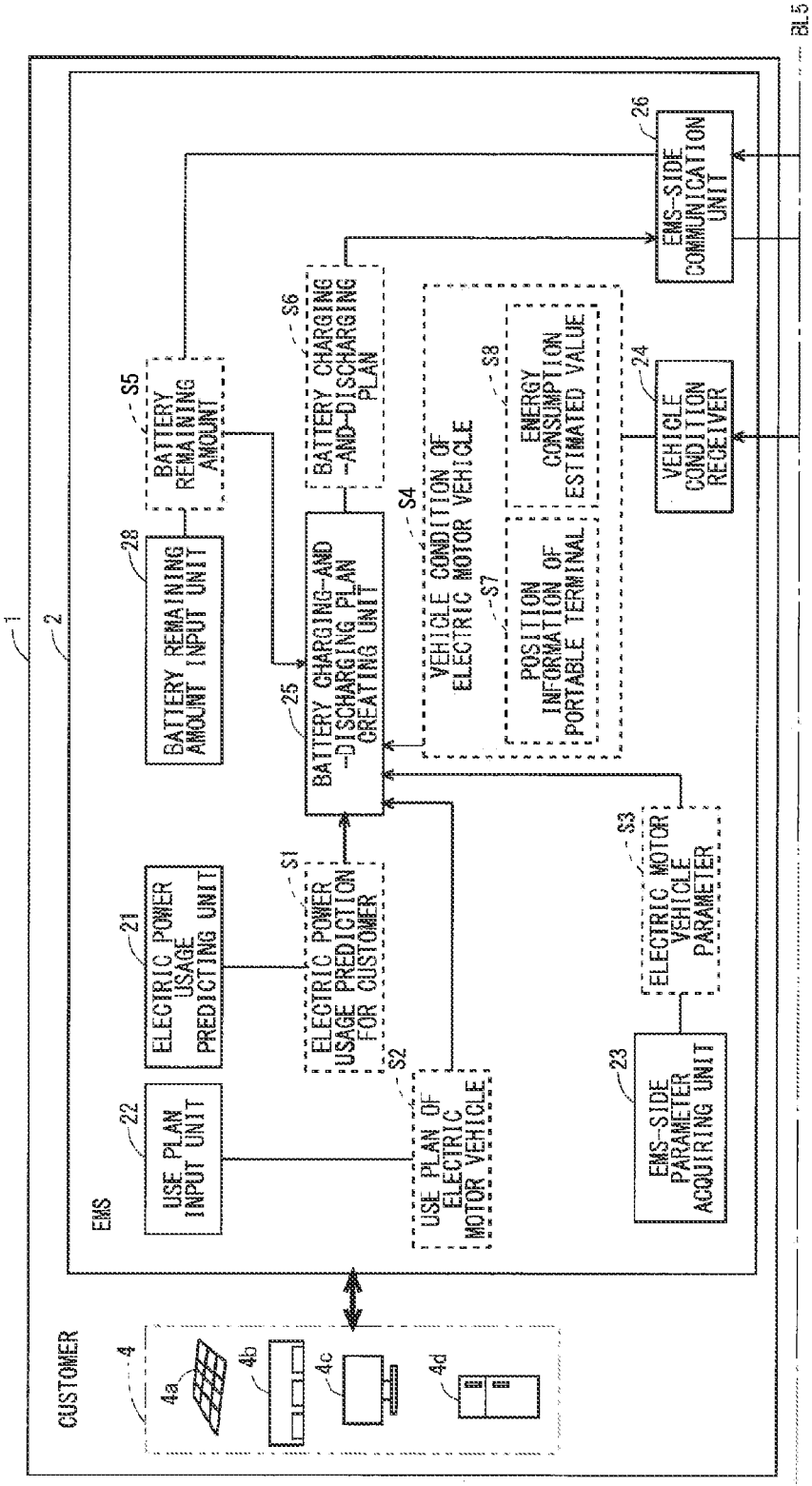
FIG. 20 A block diagram showing a configuration of the customer 1, the EMS 2, the electric motor vehicle 5, the portable terminal 6, and the server device 9 in an electric motor vehicle management system 10D according to a fifth embodiment of the present invention.
Figure 21:
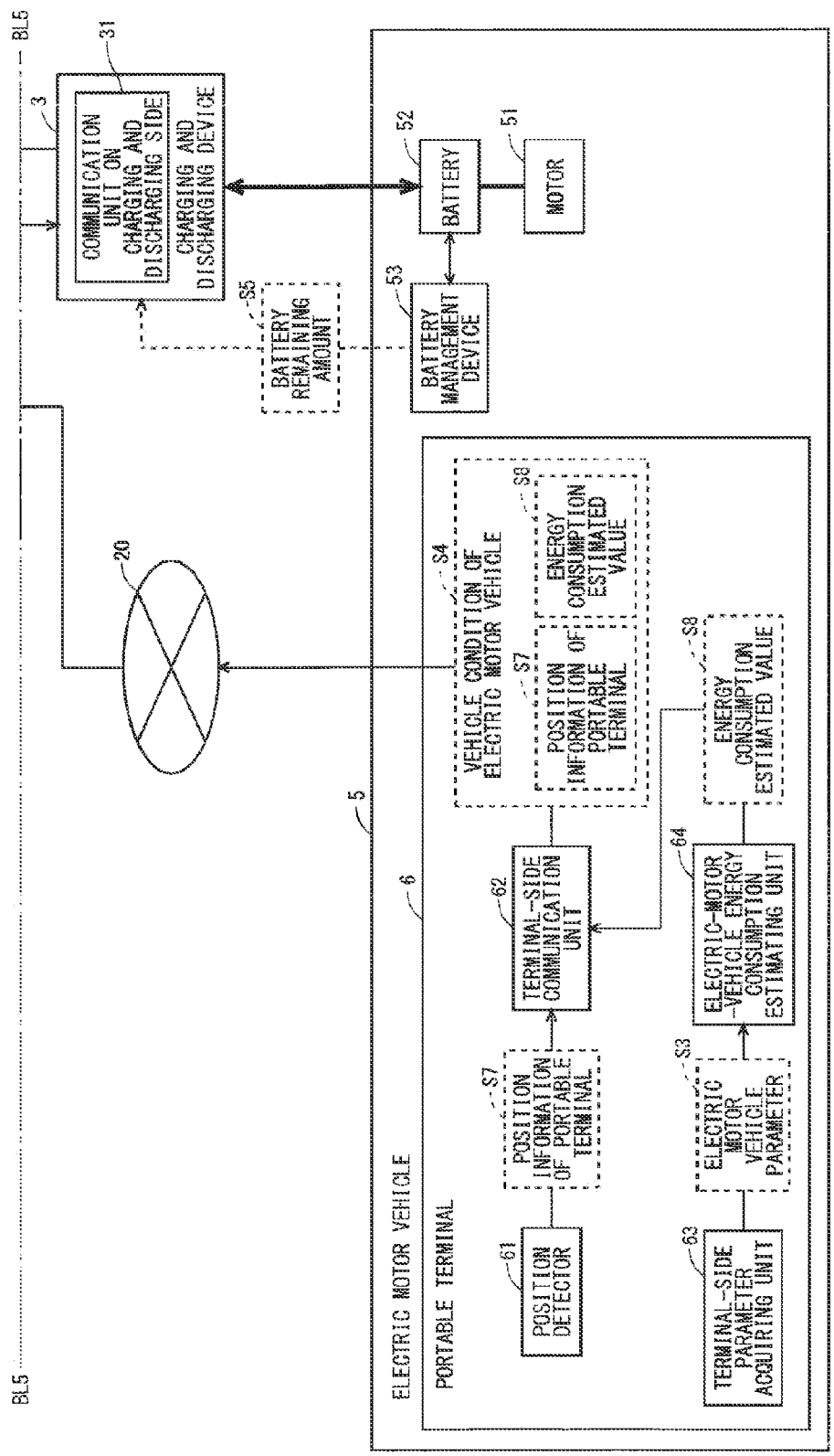
FIG. 21 A block diagram showing the configuration of the customer 1, the EMS 2, the electric motor vehicle 5, the portable terminal 6, and the server device 9 in the electric motor vehicle management system 10D according to the fifth embodiment of the present invention.

FIGS. 20 and 21 are block diagrams showing a configuration of the customer 1, the EMS 2, the electric motor vehicle 5, the portable terminal 6, and the server device 9 in the electric motor vehicle management system according to a fifth embodiment of the present invention. FIGS. 20 and 21 are connected to each other at the position of a boundary line BL5. The electric motor vehicle management system according to the present embodiment has the configuration similar to that of the electric motor vehicle management system 10B according to the third embodiment described above. Thus, the same reference signs indicate the same constituent components, and a description applied in common is omitted. In the description below, the electric motor vehicle management system according to the present embodiment is denoted by the reference sign "10D."

An electric motor vehicle management system 10D according to the present embodiment includes the customer 1, the EMS 2, the charging and discharging device 3, the household appliances 4, the electric motor vehicle 5, the portable terminal 6, the communication line 20, and the base station device 8 and the server device 9 that are shown in FIG. 1 described above. The electric motor vehicle management system 10D according to the present embodiment further includes, in the EMS 2 according to the third embodiment described above, a battery remaining amount input unit 28 that receives the battery remaining amount, in particular, the battery remaining amount information S5.

The battery remaining amount input unit 28 acquires the latest battery remaining amount information S5 of the electric motor vehicle 5. The inputting into the battery remaining amount input unit 28 is not limited to a particular method. As an example, the user makes access to the battery remaining amount input unit 28 of the EMS 2 from, for example, the portable terminal device 6 in his or her possession, or the PC or the television installed in the customer 1 through the network and inputs the latest battery remaining amount information S5. Besides, at a public charging spot (not shown) for the electric motor vehicle 5, the charging spot may automatically make access to the battery remaining amount input unit 28 of the EMS 2 to perform the inputting upon completion of charging of the electric motor vehicle 5.

The present embodiment enables, through access made from the outside of the EMS 2, the updating of the battery remaining amount information S5 conventionally acquired only through the EMS-side communication unit 26 at a time when the electric motor vehicle 5 is connected to the charging and discharging device 3. Consequently, in a case where the electric motor vehicle 5 is charged at a charging spot other than the charging and discharging device 3 in the customer 1, the user can make access to the battery remaining amount input unit 28 of the EMS 2 through the portable terminal 6, to thereby newly set the latest battery remaining amount information S5 after charging.

Even in a case where the deviation between the energy consumption estimated value obtained through arithmetic operations by the electric-motor-vehicle energy consumption estimating unit 64 and the amount of energy actually consumed by the electric motor vehicle 5 has become greater for any reason, the battery remaining amount information S5 is newly input through the battery remaining amount input unit 28 at the timing described above, thereby eliminating the deviation between the energy consumption estimated value obtained through arithmetic operations by the electric-motor-vehicle energy consumption estimating unit 64 and the amount of energy actually consumed by the electric motor vehicle 5.

As described above, in the electric motor vehicle management system 10D according to the present embodiment, which has the configuration of the electric motor vehicle management system 10B according to the third embodiment, the EMS 2 further includes the battery remaining amount input unit 28 that receives the battery remaining amount information S5. Thus, the battery remaining amount information S5 can be updated also through access made from the outside of the EMS 2. This provides the electric motor vehicle management system 10D that allows the user to newly set the latest battery remaining amount information S5 by making access to the battery remaining amount input unit 28 of the EMS 2 through the portable terminal 6 in a case where the electric motor vehicle 5 is charged at a charging spot other than the charging and discharging device 3 in the customer 1.

In the present invention, the above embodiments can be arbitrarily combined within the scope of the invention. Moreover, any constituent component in each embodiment can be appropriately varied or omitted.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1 customer, 2 energy management system (EMS), 3 charging and discharging device, 4 household appliances, 5 electric motor vehicle, 6 portable terminal device, 7 global positioning system (GPS) satellite, 8 base station device, 9 server device, 10 electric motor vehicle management system, 20 communication line, 21 electric power usage predicting unit, 22 use plan input unit, 23 EMS-side parameter acquiring unit, 24 vehicle condition receiver, 25 battery charging-and-discharging plan creating unit, 26 EMS-side communication unit, 27, 64, 92 electric-motor-vehicle energy consumption estimating unit, 28 battery remaining amount input unit, 31 communication unit on charging and discharging side, 51 motor, 52 battery, 53 battery management device, 61 position detector, 62 terminal-side communication unit, 63 terminal-side parameter acquiring unit, 91 electric motor vehicle parameter server.

The invention claimed is:

1. An electric motor vehicle management system comprising:
    an electric motor vehicle including a motor for use in travel and a battery that supplies said motor with electric power;
    an energy management system including a battery charging-and-discharging plan creating unit that creates a charging and discharging plan for said battery;
    a portable terminal device that is portable and includes
        a position acquiring unit that acquires terminal position information indicating a position of the device, and
        a terminal-side communication unit that communicates with said energy management system through a communication line; and
    a charging and discharging device that performs at least one of charging and discharging of said battery in accordance with the charging and discharging plan for said battery, wherein
    said terminal-side communication unit transmits, while said portable terminal device is located inside said electric motor vehicle, vehicle condition information including said terminal position information acquired by said position acquiring unit and indicating conditions of said electric motor vehicle to said energy management system,
    said energy management system includes a vehicle condition receiver that receives said vehicle condition information transmitted from said terminal-side communication unit, and
    said battery charging-and-discharging plan creating unit creates the charging and discharging plan for said battery through the use of said vehicle condition information received by said vehicle condition receiver.

2. The electric motor vehicle management system according to claim 1, wherein
said energy management system further includes an electric-motor-vehicle energy consumption estimating unit that estimates, through the use of at least said terminal position information out of said vehicle condition information received by said vehicle condition receiver, an energy consumption estimated value being an estimated value of energy consumed by said electric motor vehicle, and
said battery charging-and-discharging plan creating unit creates the charging and discharging plan for said battery through the use of said vehicle condition information received by said vehicle condition receiver and said energy consumption estimated value estimated by said electric-motor-vehicle energy consumption estimating unit.

3. The electric motor vehicle management system according to claim 1, wherein
said portable terminal device further includes an electric-motor-vehicle energy consumption estimating unit that estimates, through the use of at least said terminal position information acquired by said position acquiring unit, an energy consumption estimated value being an estimated value of energy consumed by said electric motor vehicle,
said terminal-side communication unit transmits, to said energy management system, said vehicle condition information including said terminal position information and said energy consumption estimated value estimated by said electric-motor-vehicle energy consumption estimating unit, and
said battery charging-and-discharging plan creating unit creates the charging and discharging plan for said battery through the use of said vehicle condition information.

4. The electric motor vehicle management system according to claim 1, comprising a server device including an electric-motor-vehicle energy consumption estimating unit that estimates an energy consumption estimated value being an estimated value of energy consumed by said electric motor vehicle, wherein
said terminal-side communication unit transmits said vehicle condition information including said terminal position information to said server device,
said electric-motor-vehicle energy consumption estimating unit estimates said energy consumption estimated value through the use of said vehicle condition information transmitted from said terminal-side communication unit,
said server device incorporates said energy consumption estimated value estimated by said electric-motor-vehicle energy consumption estimating unit into said vehicle condition information transmitted from said terminal-side communication unit and transmits said vehicle condition information including said energy consumption estimated value to said energy management system, and
said battery charging-and-discharging plan creating unit creates the charging and discharging plan for said battery through the use of said vehicle condition information transmitted from said server device.

5. The electric motor vehicle management system according to claim 1, wherein
said energy management system includes a battery remaining amount input unit that receives a battery remaining amount being an amount of electric power remaining in said battery, and
said battery charging-and-discharging plan creating unit creates the charging and discharging plan for said battery through the use of said vehicle condition information and said battery remaining amount input to said battery remaining amount input unit.

* * * * *